United States Patent
Shigematsu et al.

(10) Patent No.: US 6,735,684 B1
(45) Date of Patent: May 11, 2004

(54) PARALLEL-PROCESSING APPARATUS AND METHOD

(75) Inventors: Satoshi Shigematsu, Kanagawa (JP); Hiroki Morimura, Kanagawa (JP); Katsuyuki Machida, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 655 days.

(21) Appl. No.: 09/661,051

(22) Filed: Sep. 13, 2000

(30) Foreign Application Priority Data

Sep. 12, 1999 (JP) .......................................... 11-258522

(51) Int. Cl.[7] ............................................. G06F 15/80
(52) U.S. Cl. ........................................... 712/10; 712/16
(58) Field of Search ................................ 712/10, 11, 16, 712/22, 20, 30; 708/514, 507, 520; 714/738, 776; 711/100, 167, 168

(56) References Cited

U.S. PATENT DOCUMENTS

| | | | |
|---|---|---|---|
| 3,644,895 A | * 2/1972 | Hemdal et al. | 711/167 |
| 3,787,669 A | * 1/1974 | Muehldorf | 714/738 |
| 4,947,484 A | * 8/1990 | Twitty et al. | 714/776 |
| 5,201,029 A | * 4/1993 | Jackson | 706/42 |
| 5,268,856 A | * 12/1993 | Wilson | 708/514 |
| 6,148,101 A | * 11/2000 | Tanaka et al. | 382/156 |
| 6,304,197 B1 | * 10/2001 | Freking et al. | 341/65 |
| 6,414,957 B1 | * 7/2002 | Kang et al. | 370/395.1 |

FOREIGN PATENT DOCUMENTS

JP 10-135847 * 5/1998

OTHER PUBLICATIONS

"System Design for Pixel–Parallel Image Processing", IEEE Transaction on very large scale integration systems, vol. 4, No. 1, Mar. 1996.

* cited by examiner

Primary Examiner—Henry W. H. Tsai
(74) Attorney, Agent, or Firm—Blakely, Sokoloff, Taylor & Zafman

(57) ABSTRACT

A parallel-processing apparatus includes a plurality of cells, variable-delay circuits, a signal output unit, a delay counter, and an accumulation unit. Each cell has a processing circuit for performing arbitrary processing. The variable-delay circuits change the signal propagation delay in accordance with the processing results of the processing circuits. The signal output unit outputs a measurement input signal to the first variable-delay circuit of a variable-delay circuit array. The delay counter receives the measurement input signal output form the signal output unit and a measurement output signal output from the variable-delay circuit array, and obtains the signal propagation delay time of the variable-delay circuit array upon the basis of the measurement input and output signals. The accumulation unit accumulates the processing results of the processing circuits. A parallel processing method is also disclosed.

33 Claims, 18 Drawing Sheets

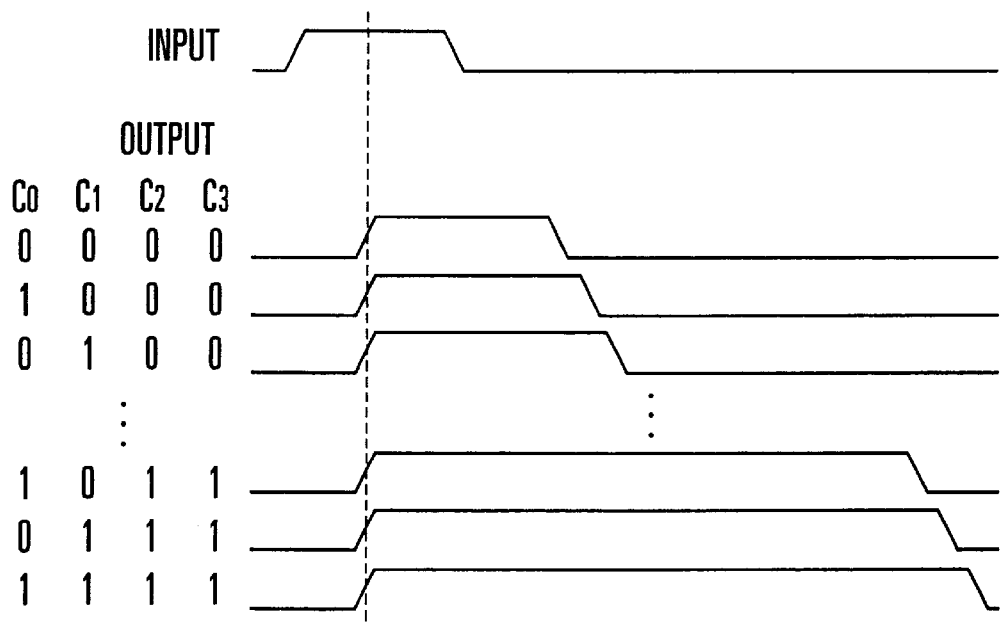
FIG. 16
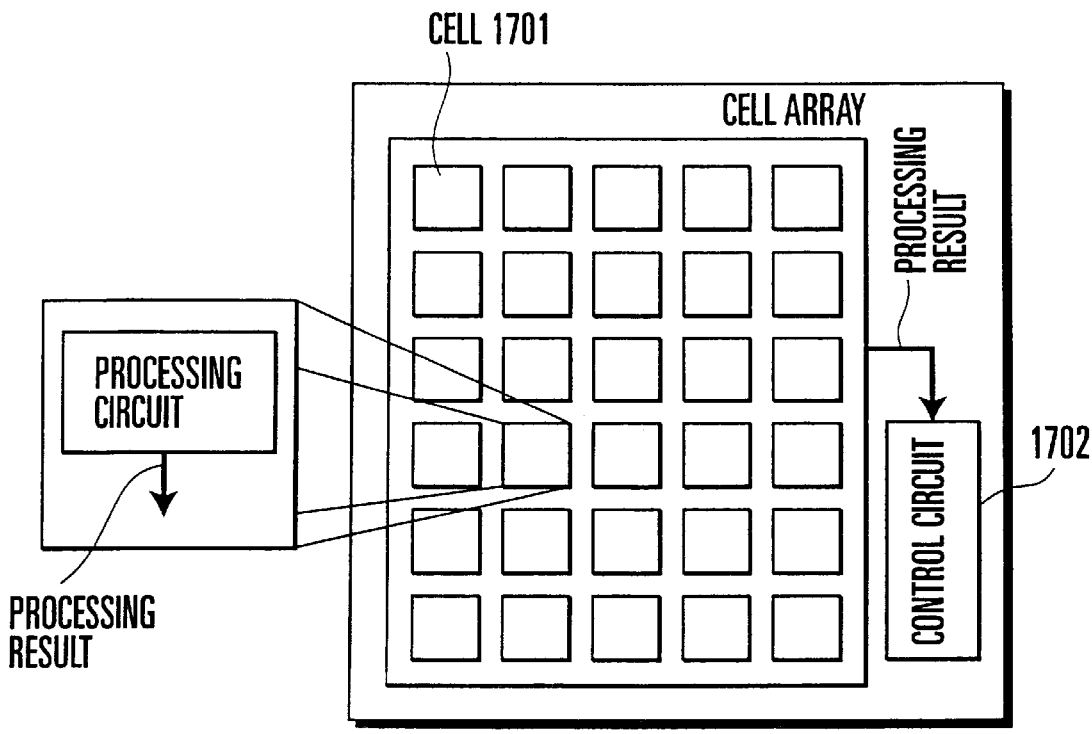
(PRIOR ART) FIG. 17

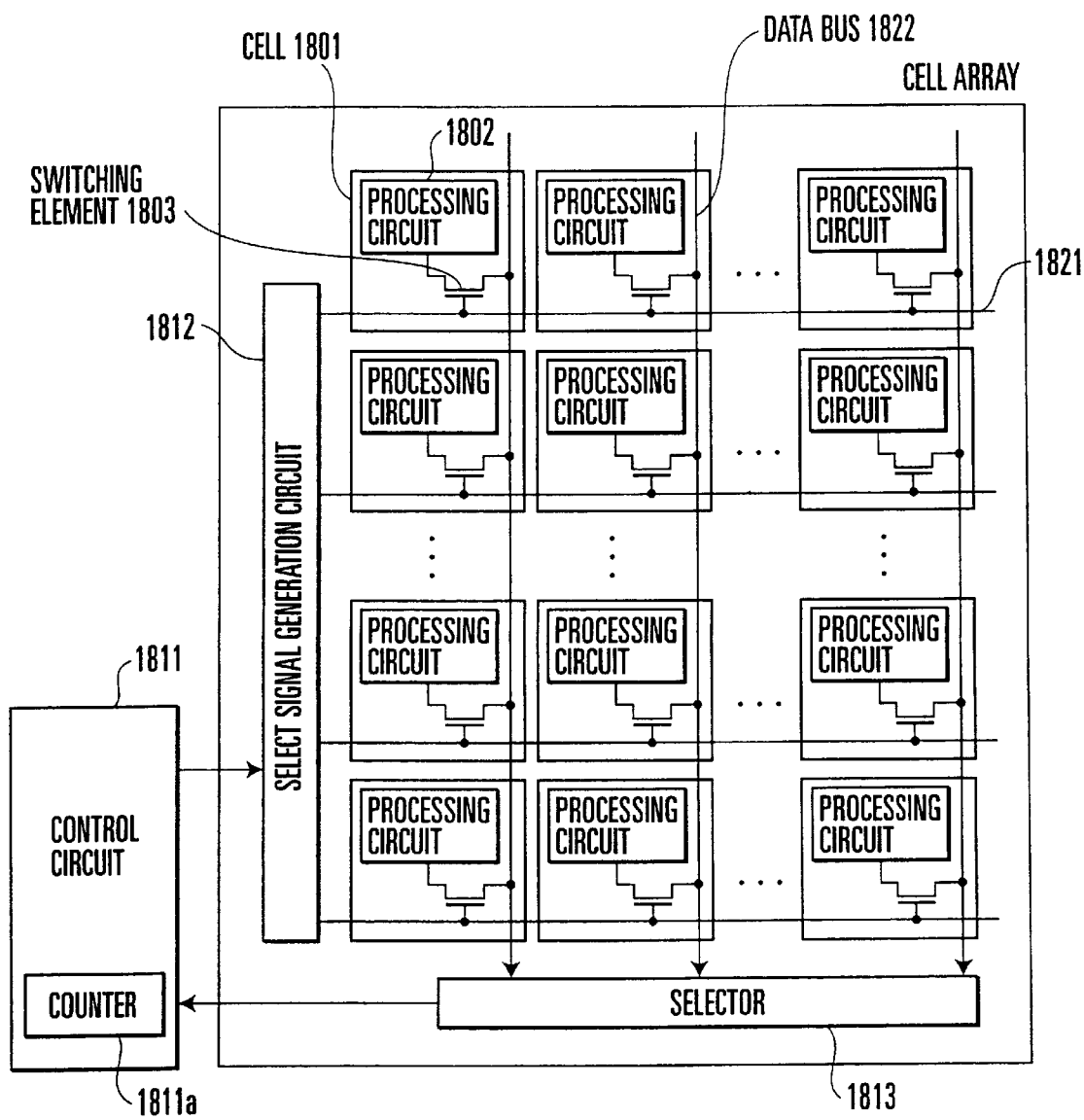
(PRIOR ART) FIG. 18

PARALLEL-PROCESSING APPARATUS AND METHOD

BACKGROUND OF THE INVENTION

The present invention relates to a parallel-processing apparatus for accumulating the processing results of the parallel-processing apparatus and, more particularly, to a parallel-processing apparatus and method for accumulating processing results at a high speed with low power consumption.

Recently, many parallel-processing apparatuses for parallel-executing processing such as calculations have been studied and developed for higher-speed processing in the computer field. As one of the arrangements of parallel-processing apparatuses, an array is formed by arranging in a matrix a plurality of cells (also called processing elements) capable of singly executing processing, and the respective cells in this cell array parallel-operate to achieve calculation processing. A parallel-processing apparatus constituted by the cell array can perform, at a high speed with low power consumption, SIMD (Single Instruction Multiple Data) processing of parallel-executing common calculation for many data in image processing or the like.

Examples of the parallel-processing apparatus are a processing circuit (Sigematsu et al., U.S. Ser. No. 091472.392) which has a fingerprint sensor and fingerprint authentication circuit in each cell, and processes by parallel operation of all the cells whether a fingerprint obtained by the fingerprint sensor coincides with a registered fingerprint, and an apparatus (J. C. Gealow et al., "System Design for Pixel-Parallel Image Processing", IEEE Transaction on very large scale integration systems, vol. 4, no. 1, 1996) in which each cell has an image processing circuit, and various image processes are done for an image acquired by an optical sensor or the like by parallel operation of all the cells.

A parallel-processing apparatus constituted by the cell array will be explained briefly. In this parallel-processing apparatus, as shown in FIG. 17, a plurality of cells 1701 each having a processing circuit are arrayed in a matrix, and perform parallel processing on the basis of data and an instruction supplied from a control circuit 1702. After parallel processing of the respective cells 1701, the control circuit 1702 accumulates processing results output from the processing circuits of the cells 1701, and generates and outputs the total processing results.

If the parallel-processing apparatus has many cells, the processing circuit in each cell is simplified, and the processing result of the processing circuit in the cell represents only true/false or a number having several digits. A parallel-processing apparatus with the above cell array arrangement is often applied to image processing. In image processing, each cell executes predetermined processing for several dots forming an image to be processed. For example, in image processing such as pattern matching, each cell performs image processing for dots in an image that are assigned thereto, and outputs "true/false" or the like as a comparison result. After parallel processing of respective processes, the control circuit accumulates "true" outputs from the processing circuits of cells, calculates the image matching ratio on the basis of the number of accumulated "true" outputs, and generates the image matching ratio as a pattern matching processing result.

When a large number of processing circuits are independently distributed, like the above parallel-processing apparatus, data processed by respective processing circuits must be collected at one portion. If data cannot be collected at a high speed, this degrades the effect of high-speed calculation by parallel processing.

Accumulation processing of the parallel-processing apparatus for collecting processed data at one portion adopts a method of reading out processing results from the cell array and accumulating them, like a DRAM (Dynamic Random Access Memory), or a method of transferring processing results by respective cells in a bucket brigade manner and accumulating them.

According to the first method of reading out processing results from the cell array and accumulating them, like a DRAM, processing results are read out from respective cells as follows. In the first method, as shown in FIG. 18, a processing circuit 1802 in each cell 1801 is connected to a corresponding data bus 1822 via a switching element 1803 controlled by a select signal sent via a control line 1821. The select signal is generated by a select signal generation circuit 1812 in accordance with a signal from a control circuit 1811. The same select signal is input to cells 1801 on the same row of the cell array.

Each data bus 1822 connected via the switching elements 1803 is commonly connected to each column of the cell array, and is connected to a selector 1813. The selector 1813 connected to the respective data buses 1822 sequentially selects one data bus 1822 in accordance with a signal from the control circuit 1811, and connects the selected data bus 1822 to a counter 1811a in the control circuit 1811.

In the parallel processing circuit of FIG. 18 in which the cells 1801, control lines 1821, and data buses 1822 are connected, the control circuit 1811 controls the select signal generation circuit 1812 to enable the control lines 1821 in units of rows after processing of all the cells 1801, and turns on the switching elements 1803 of the cells 1801 connected to the enabled control line 1821. Each cell 1801 whose switching element 1803 is ON outputs the processing result of the processing circuit 1802 to the data bus 1822 via the switching element 1803.

The processing result output to the data bus 1822 is input to the selector 1813. The selector 1813 sequentially selects processing results output to the data buses 1822 of respective columns in units of columns, and sends the selected results to the counter 1811a. The counter 1811a counts the processing results sequentially sent in units of columns, thereby accumulating the processing results of all the cells 1801. The count operation of the counter 1811a accumulates the processing results of all the cells 1801.

However, the first method requires a select signal generation circuit for selecting a control line and a selector for selecting a data bus, which increases the area of the parallel-processing apparatus. In addition, the processing circuit of each cell must drive a data bus in order to output a processing result, which decreases the speed and increases power consumption.

According to the second method of transferring processing results by respective cells in a bucket brigade manner, processing results are read out from respective cells as follows. In the second method, as shown in FIG. 19, each cell 1901 has a register 1903 and selector 1904 in addition to a processing circuit 1902. The selector 1904 selects either of data from an adjacent cell 1901 that is input via an input signal line 1921, and a processing result from the processing circuit 1902, and outputs the selected data to the register 1903. The register 1903 holds a signal from the selector 1904 in accordance with a write signal from the control circuit 1911 via a write signal line 1922, and outputs the held signal to an adjacent cell 1901. All the cells 1901 are connected in an array, and an output from the final cell 1901 is input to a counter 1911a in a control circuit 1911.

According to the second method, in the parallel-processing apparatus, after the processes of all the cells 1901 are completed, the processing result of each processing circuit 1902 is selected by the selector 1904 and held by the register 1903. Then, the selector 1904 selects a signal from an adjacent cell 1901, and sends a write signal to the registers 1903 in all the cells 1901 to transfer the processing result held by a corresponding register 1903 to an adjacent cell 1901. Transfer of the processing result can be repeated by the total number of cells 1901 to transmit the processing results of all the cells 1901 to the counter 1911a. The counter 1911a can count the transmitted processing results to accumulate them.

However, the second method must transmit a write signal for the register 1903 to all the cells 1901 by the total number of cells 1901. If the number of cells 1901 is large, power is greatly consumed. If a skew caused by a delay or the like is generated in a signal in transmitting a write signal, the register 1903 may fail in write. To prevent the write failure by the register 1903, a multilevel write signal must be used, or a delay circuit or the like must be inserted in a write signal line, resulting in a low accumulation speed.

As described above, to read out and accumulate processing results from a cell array, like a DRAM, conventional parallel processing requires a select signal generation circuit for selecting a control line and a selector for selecting a data bus, which increases the area of the parallel-processing apparatus. In this method, the processing circuit of each cell must drive a data bus in order to output a processing result, which decreases the speed and increases power consumption.

In the method of transferring processing results by respective cells in a bucket brigade manner and accumulating them, a register write signal must be transmitted by the total number of cells. If the number of cells is large, power is greatly consumed. If a skew caused by a delay or the like is generated in a signal in transmitting a write signal, the register may fail in write. To prevent this write failure, a multilevel write signal must be used, or a delay circuit or the like must be inserted in a write signal line, resulting in a low accumulation speed.

SUMMARY OF THE INVENTION

The present invention has been made to overcome the conventional drawbacks, and has as its object to accumulate the processing results of all the cells at a high speed with low power consumption in a parallel-processing apparatus constituted by a plurality of cells for performing processing.

To achieve the above object, according to the present invention, there is provided a parallel-processing apparatus comprising a plurality of cells each having a processing circuit for performing arbitrary processing, variable-delay circuits which are respectively arranged in the cells, change a signal propagation delay in accordance with processing results of the processing circuits in corresponding cells, and are series-connected over the plurality of cells, signal output means for outputting a measurement input signal to a first variable-delay circuit of a variable-delay circuit array constituted by series-connecting all the variable-delay circuits, a delay counter for receiving the measurement input signal output from the signal output means and a measurement output signal output from a final variable-delay circuit of the variable-delay circuit array upon input of the measurement input signal to the first variable-delay circuit of the variable-delay circuit array, and obtaining a signal propagation delay time of the variable-delay circuit array on the basis of the measurement input and output signals, and accumulation means for accumulating processing results of the processing circuits in the plurality of cells on the basis of the signal propagation delay time of the variable-delay circuit array obtained by the delay counter.

BRIEF DESCRIPTION OF THE DRAWINGS

FIG. 16 is a waveform chart showing the waveform of an operation signal in the variable-delay circuit having the circuit arrangement in FIG. 15;

FIG. 17 is a block diagram showing the arrangement of a conventional parallel-processing apparatus;

FIG. 18 is a block diagram showing another arrangement of the conventional parallel-processing apparatus;

DESCRIPTION OF THE PREFERRED EMBODIMENTS

Preferred embodiments of the present invention will be described below with reference to the accompanying drawings.

First Embodiment

Figure 1:
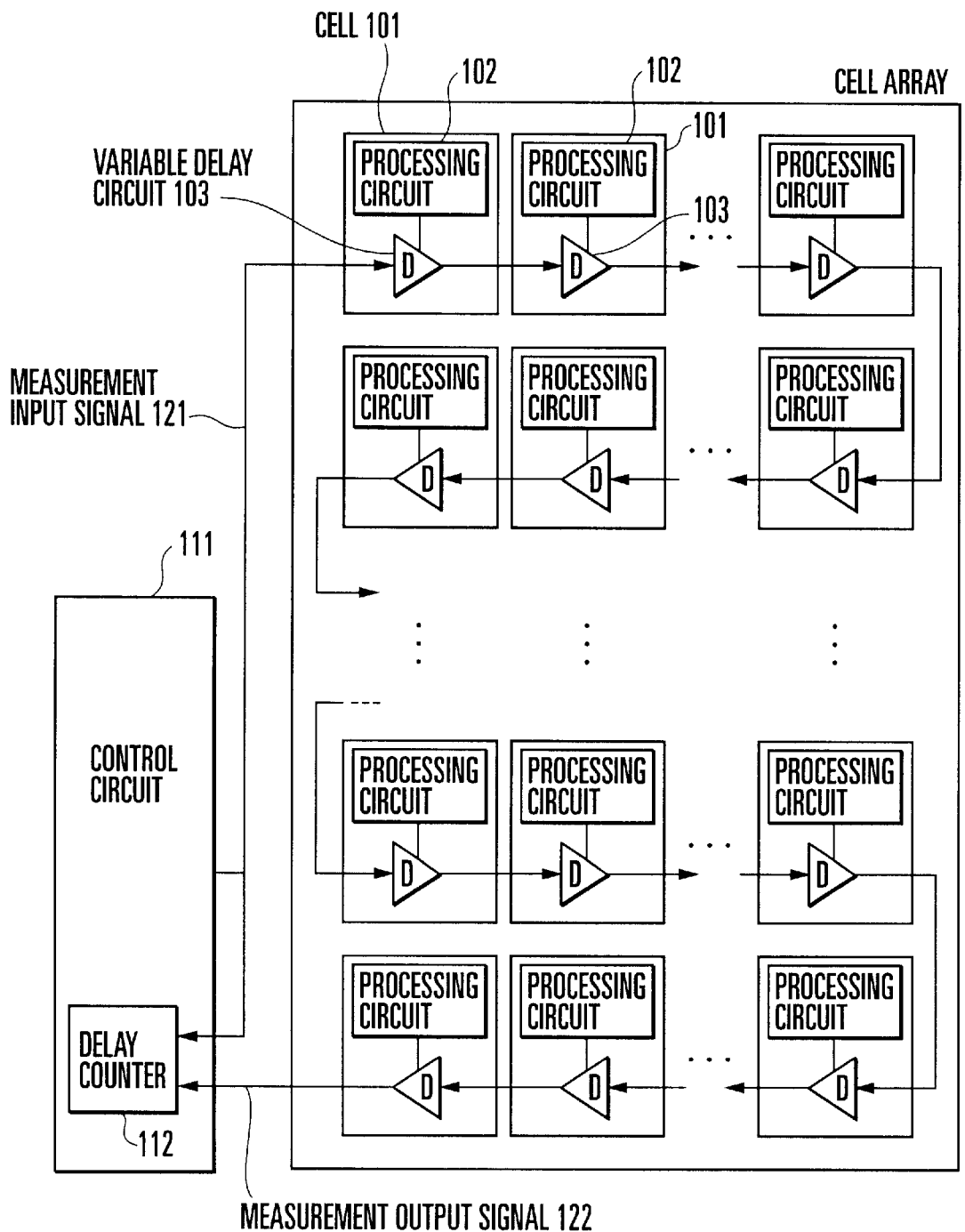
FIG. 1 is a block diagram showing the arrangement of a parallel-processing apparatus in the first embodiment of the present invention.

The first embodiment of the present invention will be described. As shown in FIG. 1, a parallel-processing apparatus according to the first embodiment comprises a cell array constituted by a plurality of cells 101, and a control circuit 111. Each cell 101 constituting the cell array is made up of a processing circuit 102 and variable-delay circuit 103. The processing result of the processing circuit 102 is input to the variable-delay circuit 103, which changes the delay time of a signal passing through the variable-delay circuit 103 in accordance with the input processing result.

The output of the variable-delay circuit 103 is connected to the variable-delay circuit 103 of an adjacent cell 101, and the variable-delay circuits 103 of all the cells 101 are connected in an array serially. An output from the final variable-delay circuit 103 on the array of the variable-delay circuits 103 is input to a delay counter (delay measurement means) 112 in the control circuit 111. The input of the first variable-delay circuit 103 on the array of the variable-delay circuits 103 is connected to the control circuit 111 via a signal line 121, and the signal line 121 is also connected to the delay counter 112. The control circuit 111 transmits a measurement input signal to the first variable-delay circuit 103 on the array of the variable-delay circuits 103. This measurement input signal propagates through all the variable-delay circuits 103 on the array of the variable-delay circuits 103, and is input as a measurement output signal to the delay counter 112 via a signal line 122.

Figure 2:
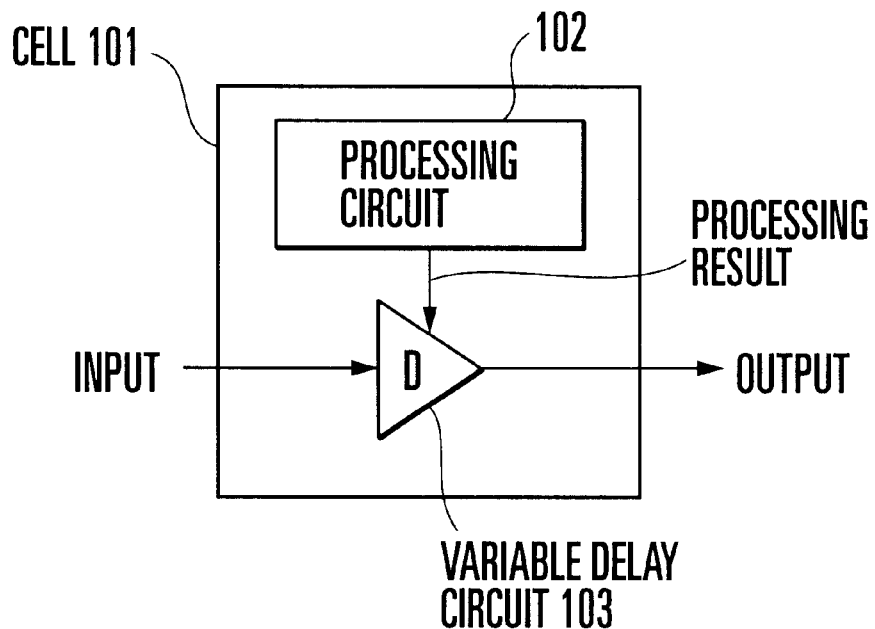
FIG. 2 is a diagram showing the arrangement of a cell in FIG. 1.
Figure 3:
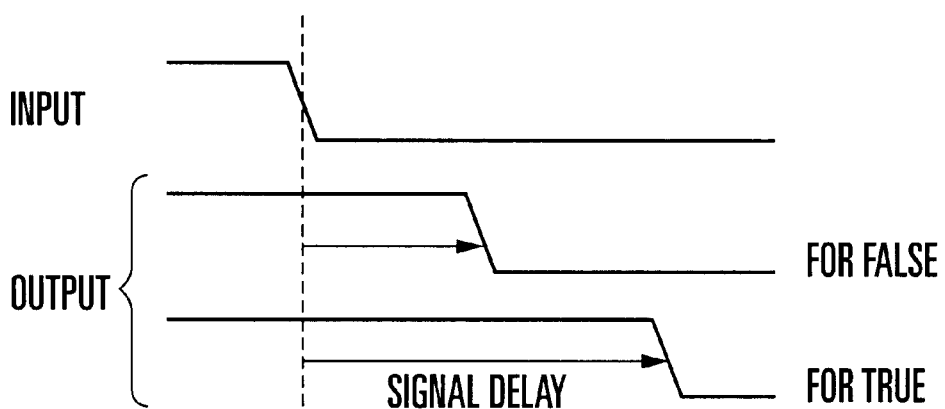
FIG. 3 is a waveform chart showing the waveform of each output signal from an output terminal when a fall signal is input to the input terminal of a variable-delay circuit 103 in FIGS. 1 and 2.

FIG. 2 shows the arrangement of the cell 101. Each cell 101 is comprised of the processing circuit 102 and variable-delay circuit 103. The processing result of the processing circuit 102 is input to the control terminal of the variable-delay circuit 103. The variable-delay circuit 103 has input, output, and control terminals. The variable-delay circuit 103 delays a signal input to the input terminal in accordance with the state of a signal input to the control terminal, and outputs the delayed signal to the output terminal. FIG. 3 shows an example of the waveform of each output signal output from the output terminal when a fall signal is input to the input terminal of the variable-delay circuit 103 in FIG. 2. In the example of FIG. 3, if a control signal input to the control terminal is false, a delay from the input to output terminals is short; and if the control signal is true, a signal is output from the output terminal with a longer delay than a false signal. Although the true/false relationship can be reversed, this embodiment assumes that signal propagation is delayed longer for a true signal than a false signal.

Figure 20:
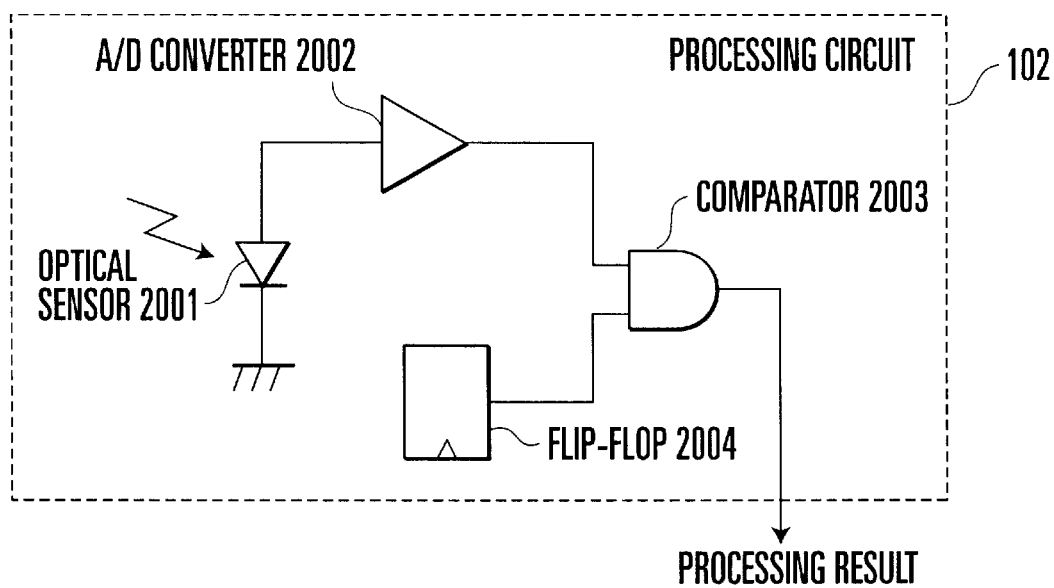
FIG. 20 is a circuit diagram showing an example of a processing circuit in the embodiment of the present invention.

FIG. 20 shows an example of the processing circuit 102. The processing circuit 102 checks whether an image read by an optical sensor 2001 coincides with a registered image. A plurality of cells 101 are arrayed in a matrix, as shown in FIG. 1, so that their optical sensors 2001 are also arrayed in a matrix. Thus, the optical sensors 2001 constitute a two-dimensional image sensor. Note that a plurality of cells 101, i.e., optical sensors 2001 need not be arrayed in a matrix, and may be linearly arrayed.

The processing circuit 102 has the optical sensor 2001 for converting the intensity of light into an electrical signal, an A/D converter 2002 for converting the signal photoelectrically converted by the optical sensor 2001 into digital data, a flip-flop 2004 for storing data of one pixel of a registered image, and a comparator 2003 for comparing an output from the A/D converter 2002 with an output from the flip-flop, and outputting "true" if these outputs coincide with each other and "false" if they do not coincide with each other. An image portion read by the optical sensor 2001 and a registered image data portion stored in the flip-flop 2004 are parallel-compared with each other for each cell, and the comparison result is input as a processing result to the variable-delay circuit 103 (FIGS. 1 and 2). These processing results are accumulated to obtain the matching ratio of the entire image.

Figure 4:
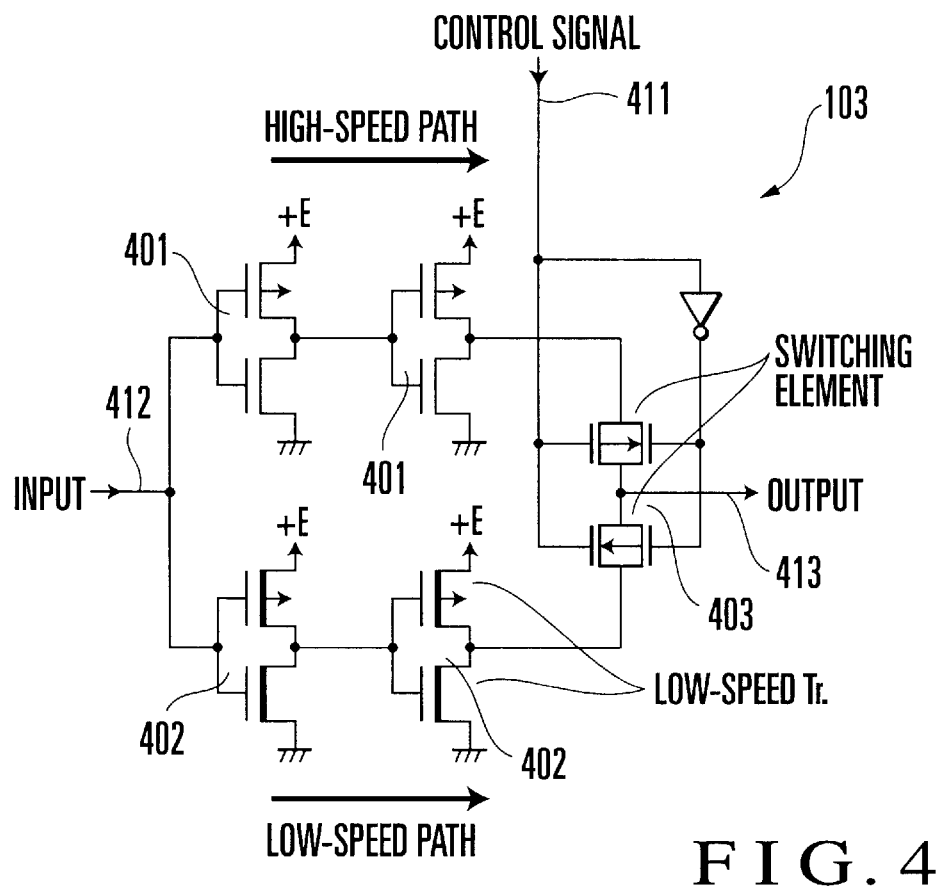
FIG. 4 is a circuit diagram showing the arrangement of the variable-delay circuit 103 in FIGS. 1 and 2.

FIG. 4 shows the circuit arrangement of the variable-delay circuit 103 in more detail. The variable-delay circuit 103 has a high-speed path prepared by connecting two inverter circuits 401 made up of general transistors, and a low-speed path prepared by connecting two inverter circuits 402 made up of transistors lower in operation speed than general transistors. Either of the high- and low-speed paths is selected in accordance with an input control signal by a switching element 403 switched by a control signal input from a control terminal 411. A signal input to an input terminal 412 is output to an output terminal 413 via the path selected by the switching element 403. The transistor low in operation speed can be implemented by widening the gate width of the transistor or increasing the threshold voltage.

Figure 5:
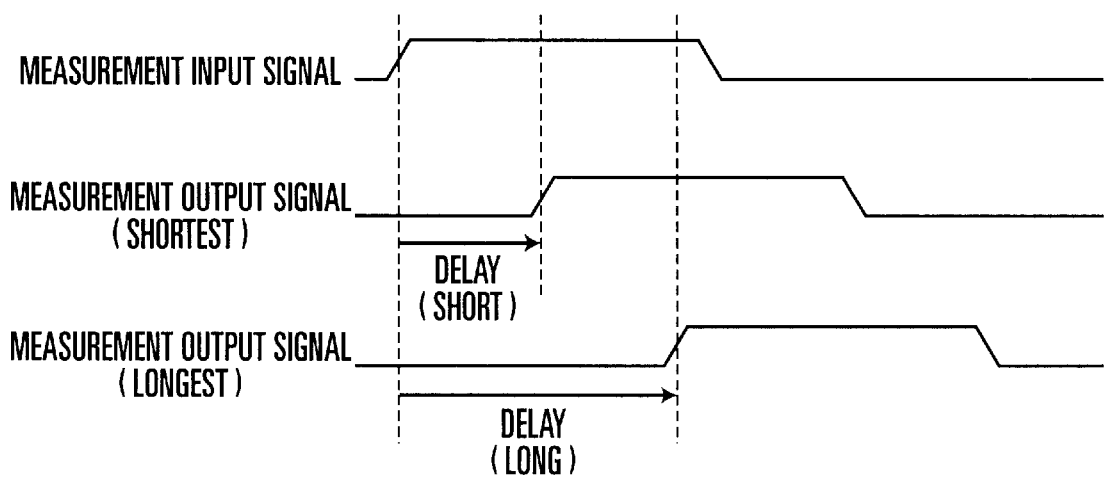
FIG. 5 is a waveform chart showing the waveform of an operation signal in the parallel-processing apparatus of FIG. 1.

FIG. 5 shows the waveform of an operation signal in the circuit of FIG. 1 using the cell 101. A measurement input signal transmitted by the control circuit 111 propagates through the array of the variable-delay circuits 103 of the cells 101, and is output as a measurement output signal. The signal propagation delay time of each variable-delay circuit 103 changes depending on the processing result in the cell 101. Thus, the delay time of the measurement output time having propagated through all the variable-delay circuits 103 with respect to the measurement input signal can be measured to accumulate the processing results of all the cells 101. More specifically, when all the processing results of the cells 101 of the cell array are false, the delay time is shortest; and when all the processing results are true, the delay time is longest. This delay time is measured by the delay counter 112 in the control circuit 111, and the measurement result of the delay counter 112 serves as the accumulation result of the processing results of all the cells 101 in the cell array.

Figure 6:
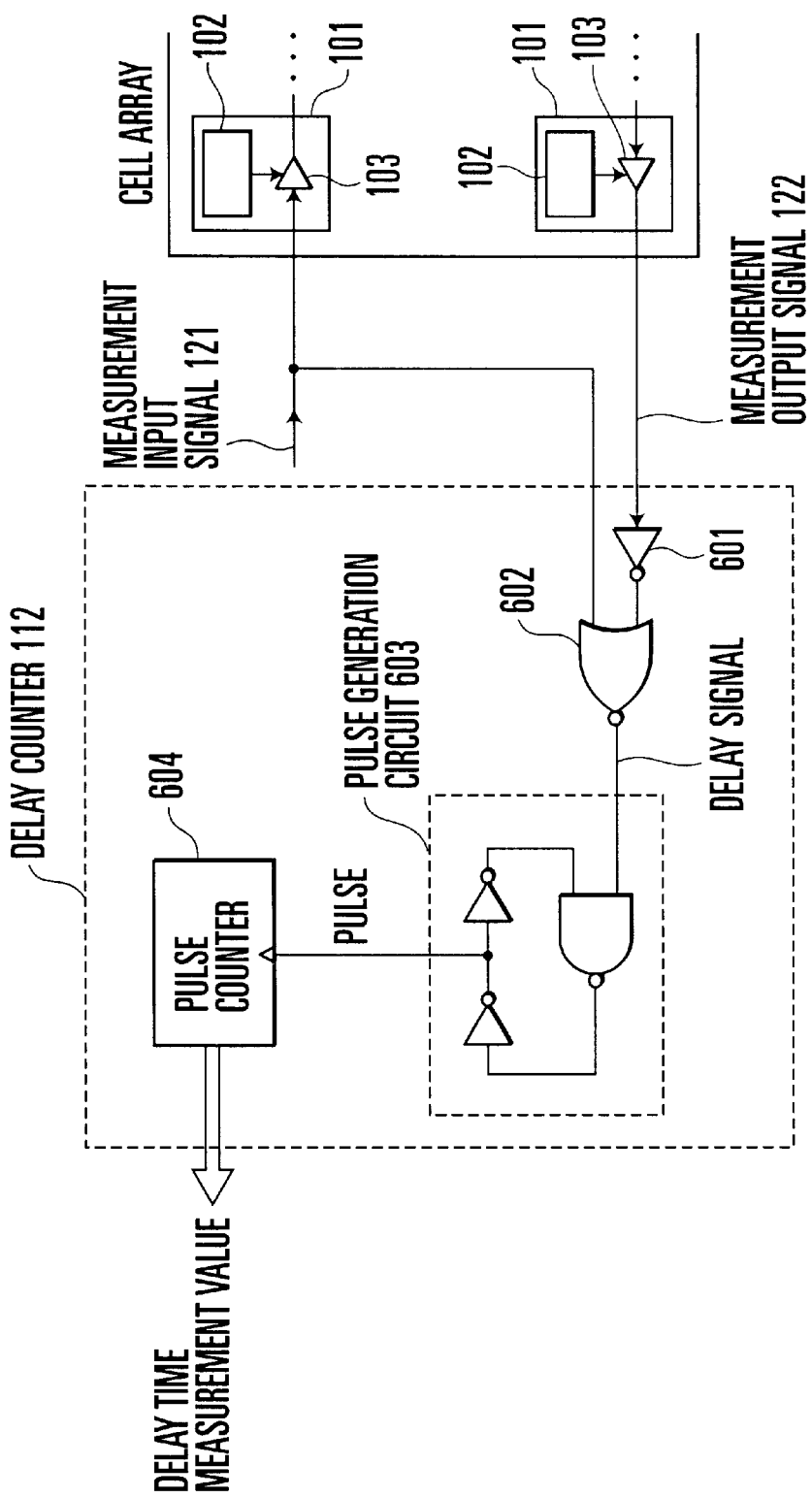
FIG. 6 is a diagram showing the arrangement of a delay counter 112 in FIG. 1.

FIG. 6 shows a circuit constituting the delay counter 112 in more detail. The circuit shown in FIG. 6 is a circuit example when measurement of the delay time uses a fall signal. This circuit will be explained. A measurement output signal transmitted from the array of the variable-delay circuits 103 is input to a NOR circuit 602 via an inverter circuit 601. A measurement input signal transmitted by the control circuit (not shown in FIG. 6) is also input to the NOR circuit 602. An output from the NOR circuit 602 will be called a delay signal. This delay signal is at H level only when the measurement input signal is at L level, and the measurement output signal is at H level.

A delay signal output from the NOR circuit 602 is input to a pulse generation circuit 603, which generates a pulse signal having a predetermined frequency while the input delay signal is at H level. The pulse signal generated by the pulse generation circuit 603 is input to a pulse counter 604, which counts the number of input pulses and outputs the result.

Figure 7:
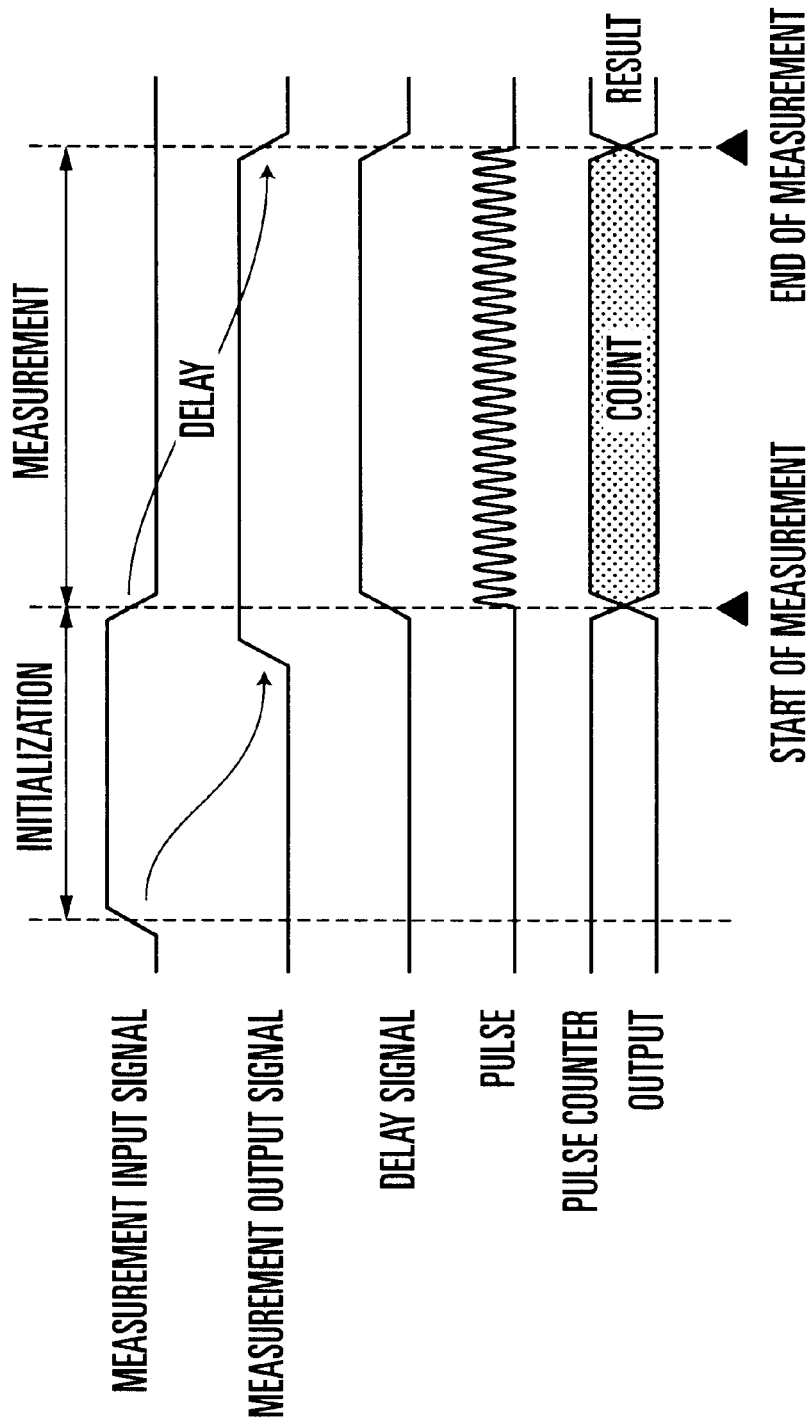
FIG. 7 is a waveform chart showing the operation waveform of the delay counter 112 having the circuit arrangement shown in FIG. 6.

FIG. 7 shows the operation waveform of the delay counter 112 having the circuit arrangement shown in FIG. 6. To initialize the measurement circuit, the measurement input signal changes to H level, and the states of all the variable-delay circuits in the cell array are set to H level. After the states of all the variable-delay circuits are initialized to H level, the measurement output signal changes to H level. The H-level measurement output signal represents completion of initialization. When the control circuit changes the measurement input signal to L level, the measurement output signal is still H level, and the delay signal changes to H level.

During the delay signal is H level, the pulse generation circuit generates a pulse, and the pulse counter counts the number of generated pulses. A fall signal input as a measurement input signal to each cell propagates through the variable-delay circuit array, and the measurement output signal finally falls to L level. After the measurement output signal falls to L level, pulse generation stops, and delay count operation ends. Since the measurement output has changed to L level, the end of measurement can be determined. The count value of the pulse counter when the measurement output signal falls to L level to end measurement represents the delay time.

Letting C be a counter value at the end of measurement, $C_0$ be a counter value when the processing results of all the cells are false, $C_1$ be a counter value when the processing results of all the cells are true, and N be the total number of cells in the cell array, a total number n of cells whose processing results are true is given by $$n=(C-C_0) \div (C_1-C_0) \times N \quad (1)$$

The delay counter 112 having the circuit arrangement shown in FIG. 6 can achieve measurement of the delay time (accumulation of processing results) generated as a result of processing of all the cells only by propagating one fall signal. Hence, the processing results of the cell array made up of many cells can be accumulated at a high speed with low power consumption. Note that accumulation of processing results may be calculated by equation (1) in the control circuit 111 or performed by the delay counter 112. Initialization of the variable-delay circuit of each cell is independent of the state of a processing result input to the variable-delay circuit, and can be executed independently of processing of the processing circuit. Hence, the variable-delay circuit can be initialized while the processing circuit in the cell performs processing, and initialization of the variable-delay circuit can be completed before the start of accumulation of processing results. The initialization time for accumulation need not be set, and processing such as measurement can immediately begin.

In the arrangement of the variable-delay circuit shown in FIG. 4, the path time may change owing to variations in temperature or power supply voltage. However, by measuring values ($C_0$, $C_1$) respectively representing a delay time when the processing results of all the cells are true and a delay time when they are false, the influence of environmental variations in temperature or power supply voltage around the circuit can be reduced to always perform accurate measurement.

The accumulation precision can be adjusted by changing the frequency of pulses generated by the pulse generation circuit. For example, setting the pulse frequency high can increase the accumulation precision. According to the parallel processing method in the first embodiment, observing a measurement output signal facilitates determining the state of accumulation operation during initialization or measurement. For example, if the observation result of the measurement output signal is H level, measurement/accumulation is in progress, and the next measurement is standby.

Second Embodiment

The second embodiment of the present invention will be described. In a parallel-processing apparatus according to the second embodiment, a circuit in FIG. 8 replaces the delay counter in the parallel-processing apparatus according to the first embodiment. In a delay counter 112 in the parallel-processing apparatus of the second embodiment, a measurement output signal transmitted from the array of variable-delay circuits 103 is input to a reset terminal R of a set/reset flip-flop 801, whereas a measurement input signal transmitted by a control circuit (not shown) is input to a set terminal S of the set/reset flip-flop 801.

A delay signal is output from an output terminal D of the set/reset flip-flop 801, and input to a pulse generation circuit 603. Similar to the circuit shown in FIG. 6, the pulse generation circuit 603 generates a pulse signal having a predetermined frequency while the input delay signal is at H level. The pulse signal generated by the pulse generation circuit 603 is input to a pulse counter 604, which counts the number of pulses of the input pulse signal.

In the set/reset flip-flop 801, a delay signal output to the output terminal D changes to H level when an H-level signal is input to the set terminal S, and changes to L level when an H-level signal is input to the reset terminal R.

Figure 8:
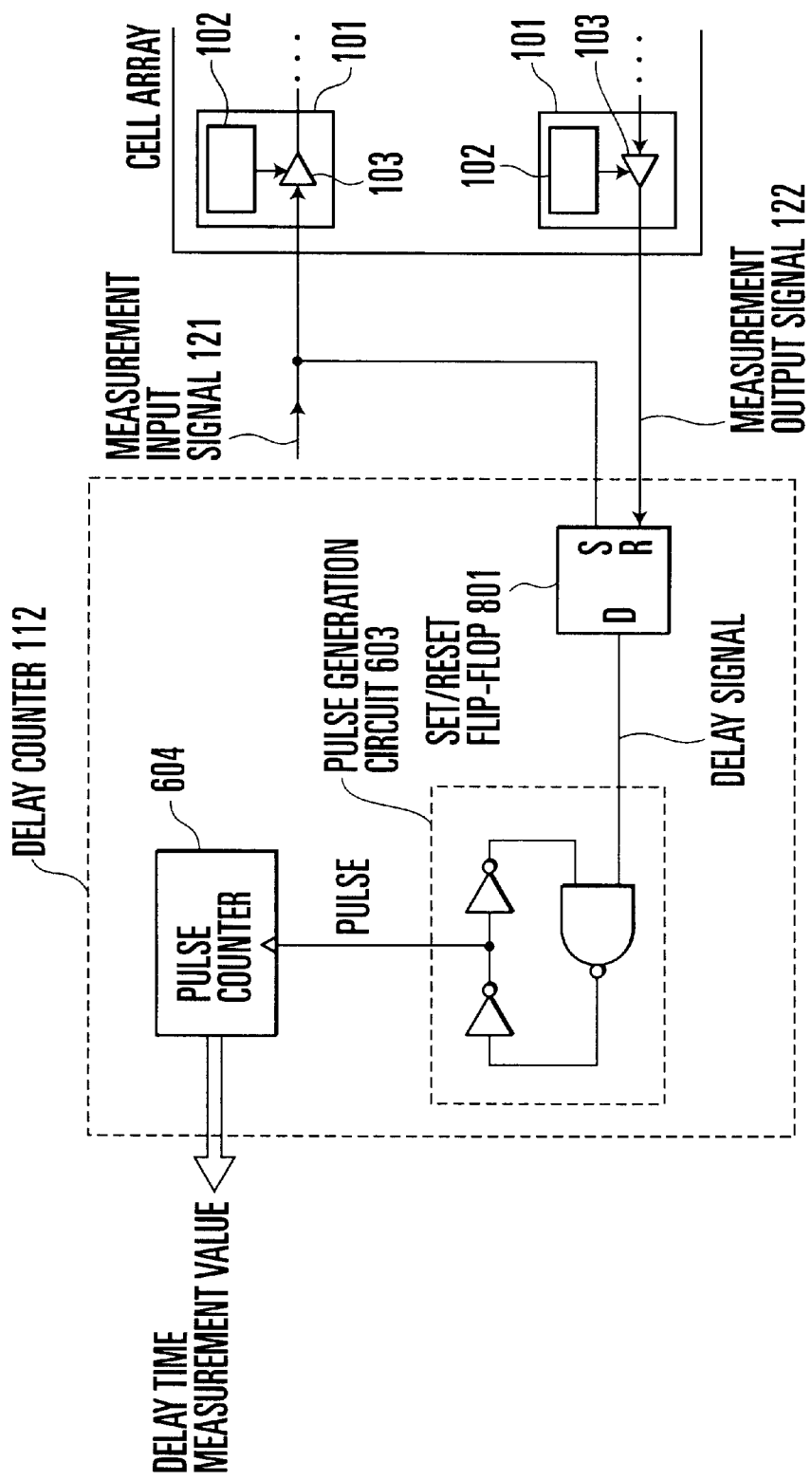
FIG. 8 is a diagram showing another arrangement of the delay counter 112 in FIG. 1.
Figure 9:
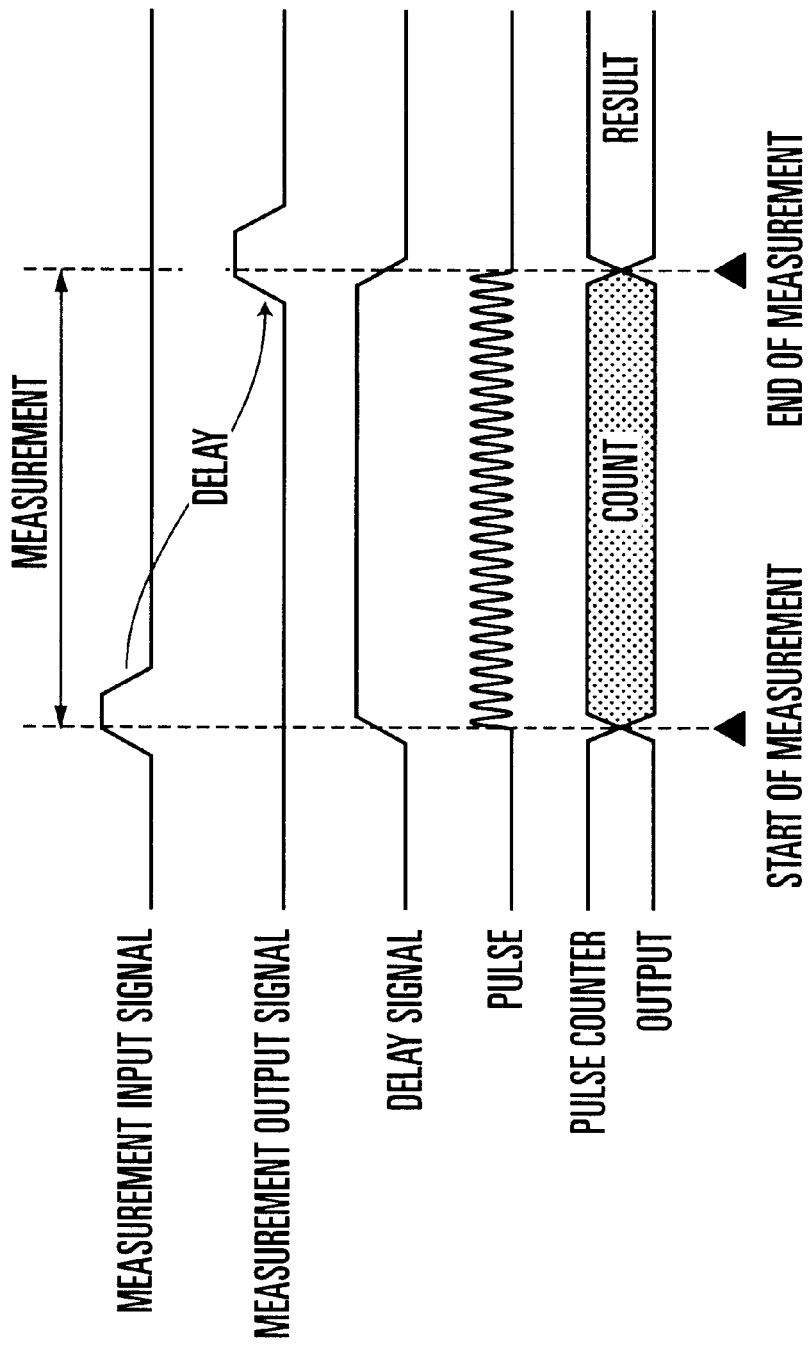
FIG. 9 is a waveform chart showing the operation waveform of the delay counter 112 having the circuit arrangement shown in FIG. 8.

Accumulation operation of the parallel-processing apparatus in the second embodiment will be explained with reference to FIG. 9 showing the operation waveform of the delay counter 112 having the circuit arrangement shown in FIG. 8.

A measurement input signal input to the variable-delay circuit 103 of a first cell 101 in the cell array is generally at L level. At the start of measurement, one pulse signal having a predetermined pulse width is input. The measurement input signal of the pulse is input to the set terminal S to change an output from the set/reset flip-flop 801 to H level. The pulse generation circuit 603 generates a pulse, and count operation of the delay time starts. The measurement input signal of the pulse propagates through the array of the variable-delay circuits 103 in the cell array, and is output as a measurement output signal from the variable-delay circuit 103 of the final cell 101.

The measurement output signal of the pulse output from the cell array is input to the reset terminal R of the set/reset flip-flop 801. In the set/reset flip-flop 801 whose reset terminal R has received the pulse of the measurement output signal, an output from the output terminal D is reset to L level. As a result of this resetting, a signal input to the pulse generation circuit 603 changes to L level, the pulse generation circuit 603 stops generating any pulse, and the pulse counter 604 stops count operation.

In the second embodiment, one pulse is input as a measurement input signal, and the delay of the pulse having propagated through the array of the variable-delay circuits 103 of the cell array is measured as an accumulation result. This embodiment need not perform any initialization operation of, for example, setting the variable-delay circuit to H level in advance.

Third Embodiment

The third embodiment of the present invention will be described.

Figure 10:
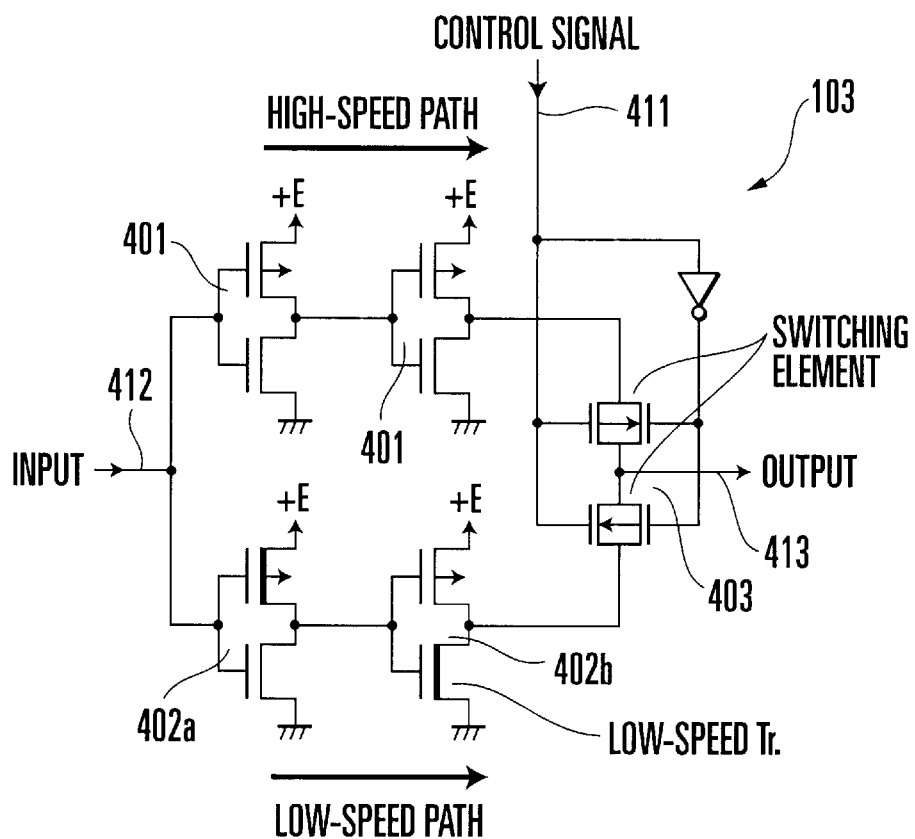
FIG. 10 is a circuit diagram showing another arrangement of the variable-delay circuit 103 in FIGS. 1 and 2.

In the third embodiment, a variable-delay circuit 103 is constituted as shown in FIG. 10. The remaining arrangement is the same as in the first embodiment shown in FIGS. 1, 2, and 6.

The variable-delay circuit 103 of the third embodiment has a high-speed path prepared by connecting two inverter circuits 401 made up of general transistors, and a low-speed path on which low-speed transistors are used for only the pMOS transistor of a preceding inverter 402a and the nMOS transistor of a subsequent inverter 402b.

Also in this variable-delay circuit 103, either of the high- and low-speed paths is selected in accordance with an input control signal by a switching element 403 switched by a control signal input from a control terminal 411. A signal input to an input terminal 412 is output to an output terminal 413 via the path selected by the switching element 403. The transistor low in operation speed can be implemented by widening the gate width of the transistor or increasing the threshold voltage.

Figure 11:
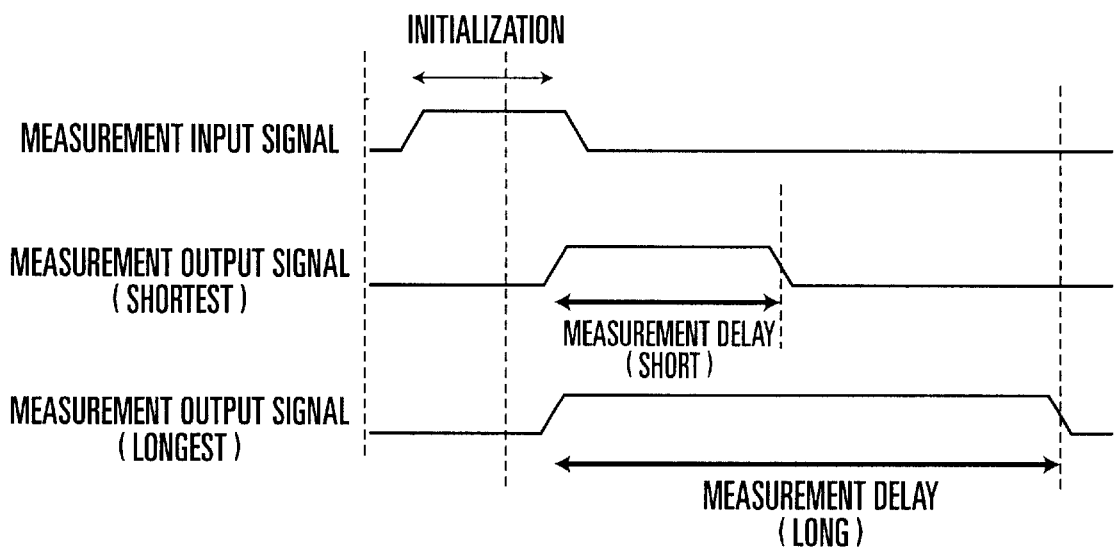
FIG. 11 is a waveform chart showing the waveform of an operation signal in a parallel-processing apparatus using the variable-delay circuit in FIG. 10.

The operation using the variable-delay circuit 103 in FIG. 10 will be explained. FIG. 11 shows the operation waveforms of a measurement input signal input to the cell array and a measurement output signal output from the cell array. To initialize the variable-delay circuit array in the cell array, a rise signal is input as a measurement input signal. In the variable-delay circuit 103 of FIG. 10, transistors for transferring a rise signal on both the low- and high-speed paths are general transistors. For this reason, the rise signal propagates through the array of the variable-delay circuits 103 within the shortest time regardless of the state of a processing result serving as a control signal for switching the path in the variable-delay circuit 103. Accordingly, the rise signal arrives as a measurement output signal within the same time regardless of the processing result of each cell 101.

After initialization by the rise signal, a fall signal is input as a measurement input signal to start measurement. In the variable-delay circuit 103 of FIG. 10, the delay time changes between the low- and high-speed paths for the fall signal, and thus the signal propagation speed of each variable-delay circuit 103 changes depending on the processing result of each cell 101 in the cell array. The fall signal having a different delay time depending on the processing result arrives as a measurement output signal. By measuring the arrival time of the fall signal as in the first embodiment, the processing results of the respective cells 101 can be accumulated.

According to the method of the third embodiment, the time spent for initializing the array of the variable-delay circuits 103 can always be minimized regardless of the processing results of the cells 101 in the cell array.

In the third embodiment, the fall signal is used as a measurement signal. Alternatively, the rise signal can also be used as a measurement signal as far as the nMOS transistor of the preceding inverter 402a and the pMOS transistor of the subsequent inverter 402b that constitute the low-speed path of the variable-delay circuit 103 in FIG. 10 are formed from low-speed transistors. In this case, a fall signal is used for initialization.

Fourth Embodiment

Figure 12:
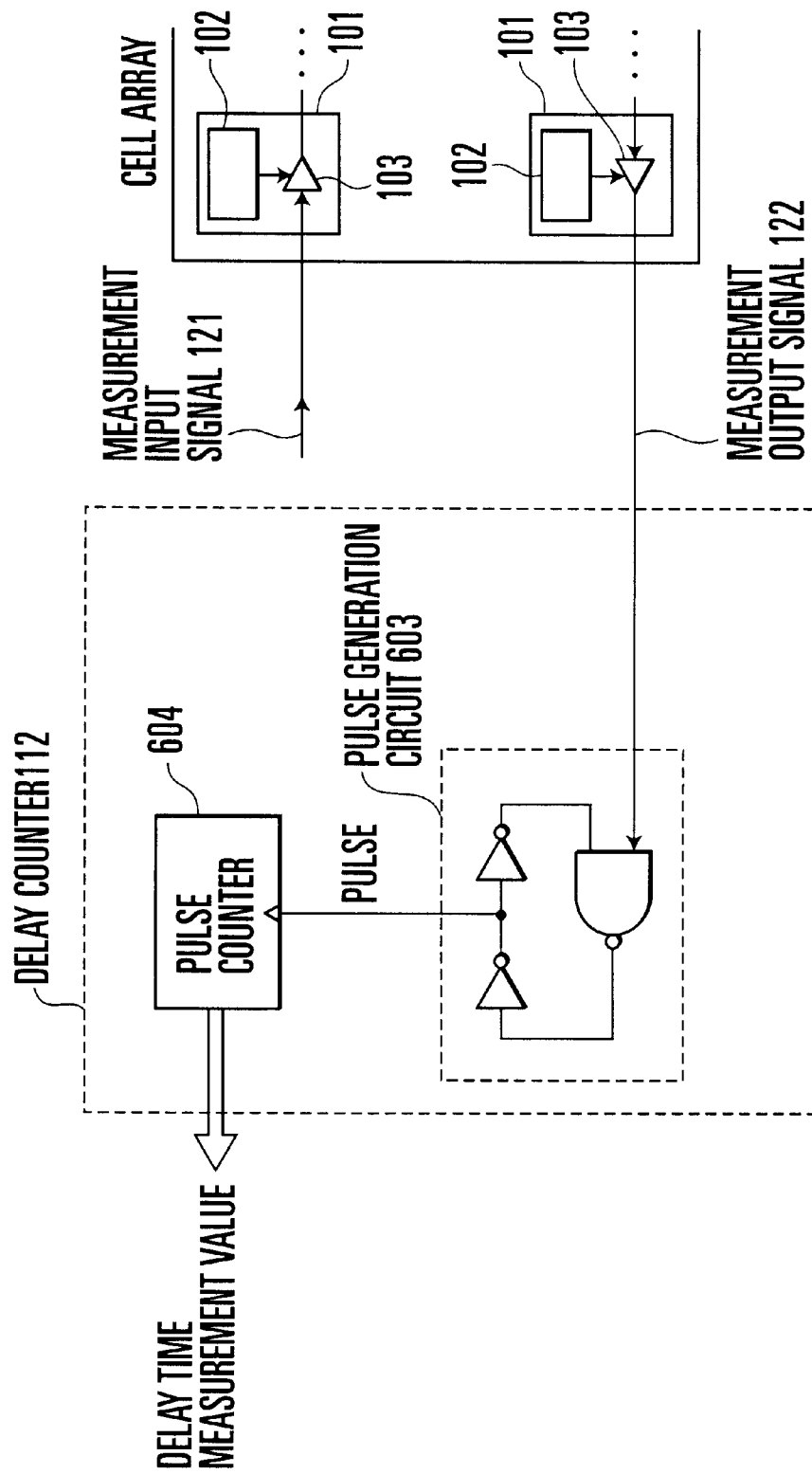
FIG. 12 is a diagram showing still another arrangement of the delay counter 112 in FIG. 1.

The fourth embodiment of the present invention will be described. In the fourth embodiment, the delay counter of the third embodiment is constituted as shown in FIG. 12. In a delay counter 112 shown in FIG. 12 according to the fourth embodiment, a measurement output signal from the array of variable-delay circuits 103 in respective cells 101 shown in FIG. 1 is directly input to a pulse generation circuit 603. The delay counter 112 uses neither the inverter circuit 601 nor NOR circuit 602, unlike the first embodiment shown in FIG. 6. The remaining arrangement is the same as in the third embodiment.

Figure 13:
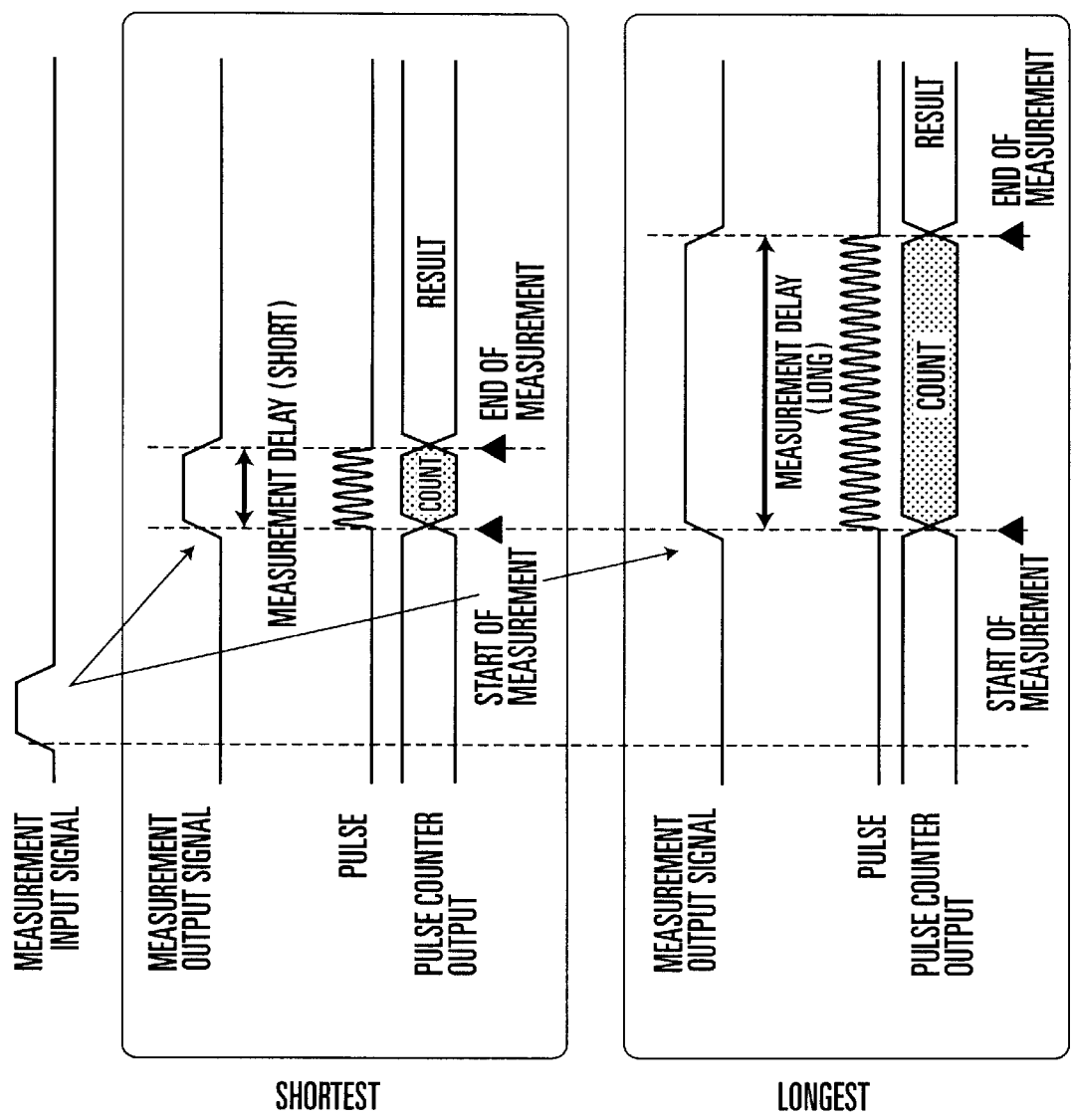
FIG. 13 is a waveform chart showing the operation waveform of the delay counter 112 having the circuit arrangement shown in FIG. 12.

The operation of a parallel-processing apparatus of the fourth embodiment using the delay counter 112 will be explained with reference to the operation waveform of FIG. 13.

A measurement input signal input to the cell array is generally at L level, and one pulse signal is input at the start of measurement. In the variable-delay circuit 103 shown in FIG. 10, the delay time is constant for a rise signal, and changes only for a fall signal in accordance with the state of a control signal. For this reason, the pulse width of a measurement output signal which is output after propagating through the array of variable-delay circuits 103 changes in accordance with the processing result of each cell 101 in the cell array.

If the measurement output signal whose pulse width changes in accordance with the processing result of each cell 101 is input to the pulse generation circuit 603, the pulse output time of the pulse generation circuit 603 changes in accordance with the pulse width of the measurement output signal. Pulses output from the pulse generation circuit 603 are counted by a pulse counter 604. Since the number of pulses counted by the pulse counter 604 corresponds to the pulse width of the measurement output signal input to the pulse generation circuit 603, processing results can be accumulated using the count result of the pulse counter 604.

According to the method of the fourth embodiment, processing results are accumulated by measuring the pulse width of a measurement output signal that changes in accordance with the processing result of each cell 101 in the cell array. By changing the pulse width of a signal input to the cell array as a measurement input signal, the counting measurement time can be changed. In other words, by shortening the pulse width of a measurement signal, high-speed accumulation operation with low power consumption can be realized.

Fifth Embodiment

Figure 14:
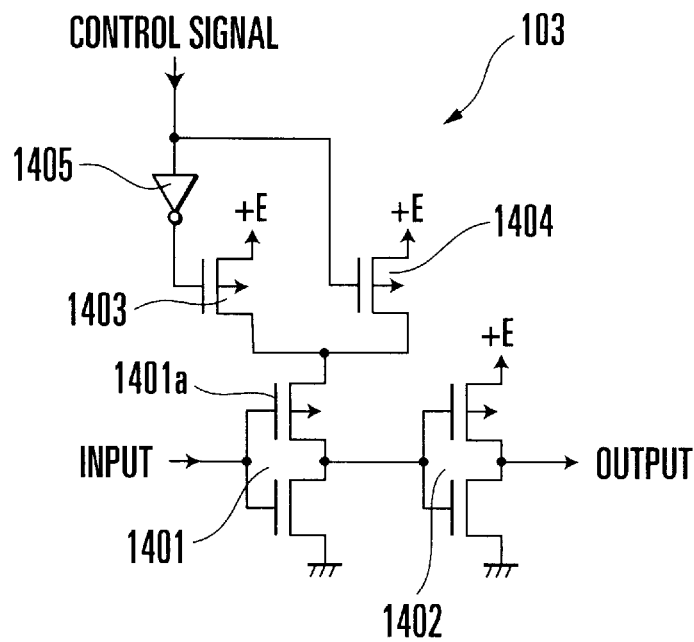
FIG. 14 is a circuit diagram showing still another arrangement of the variable-delay circuit 103 in FIGS. 1 and 2.

A parallel-processing apparatus according to the fifth embodiment of the present invention will be described. In the fifth embodiment, the variable-delay circuit is constituted by a circuit shown in FIG. 14. The remaining arrangement except for the variable-delay circuit is the same as in the first to fourth embodiments. In the fifth embodiment, as shown in FIG. 14, a path which passes an input measurement output signal is comprised of two inverter circuits 1401 and 1402. The source terminal of a pMOS transistor 1401a in the preceding inverter circuit 1401 of the path is connected to the power supply via pMOS transistors 1403 and 1404 in parallel with each other. The two pMOS transistors 1403 and 1404 have different power supply amounts. The gate of the transistor 1403 receives a control signal via an inverter element 1405, while that of the transistor 1404 directly receives the control signal.

In the variable-delay circuit 103, the two pMOS transistors 1403 and 1404 having different power supply amounts are exclusively turned on in accordance with the state of a control signal, thereby changing the power supply amount to the pMOS transistor 1401a of the preceding inverter circuit 1401. When a fall signal is input as an input signal, the operation speed changes because the power supply amount to the pMOS transistor 1401a has changed. Thus, the delay time taken for propagating the input rise signal changes. That is, the delay time taken for propagating the input rise signal changes depending on the state of the control signal input to the variable-delay circuit 103.

As shown in FIG. 2, the processing result of the processing circuit 102 is input as a control signal to the control terminal of the variable-delay circuit 103. In the circuit arrangement shown in FIG. 14, the PMOS transistor 1404 is turned on when the processing result is false (L level). In this case, the power supply amount to the pMOS transistor 1401a is increased, so that the delay time of the fall signal is shortened. To the contrary, when the processing result is true (H level), the pMOS transistor 1403 is turned on. In this case, the power supply amount to the pMOS transistor 1401a is decreased, so that the delay time of the fall signal is prolonged. Note that the delay time is shortest for a rise signal regardless of the state of the control signal.

The fifth embodiment described above can decrease the number of transistors, compared to the variable-delay circuits used in the first to fourth embodiments, and can reduce the area of the variable-delay circuit.

In the fifth embodiment, the fall signal is used as a measurement signal. Alternatively, the rise signal can also be used as a measurement signal so long as the source terminal of the nMOS transistor of the preceding inverter circuit 1401 shown in FIG. 14 is connected to the power supply via two nMOS transistors having different power supply amounts.

Sixth Embodiment

The sixth embodiment of the present invention will be described. In a parallel-processing apparatus according to the sixth embodiment, the variable-delay circuit is constituted by a circuit shown in FIG. 15 so as to enable accumulating all the processing results of the cell array even if the processing result of each processing circuit is multilevel data.

Figure 15:
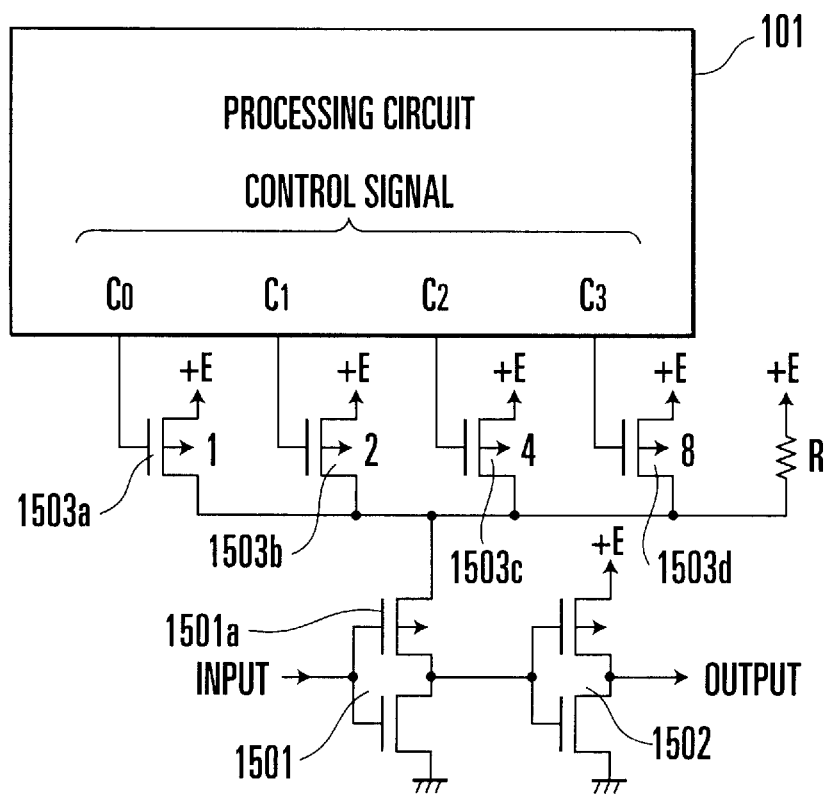
FIG. 15 is a circuit diagram showing still another arrangement of the variable-delay circuit 103 in FIGS. 1 and 2.
Figure 19:
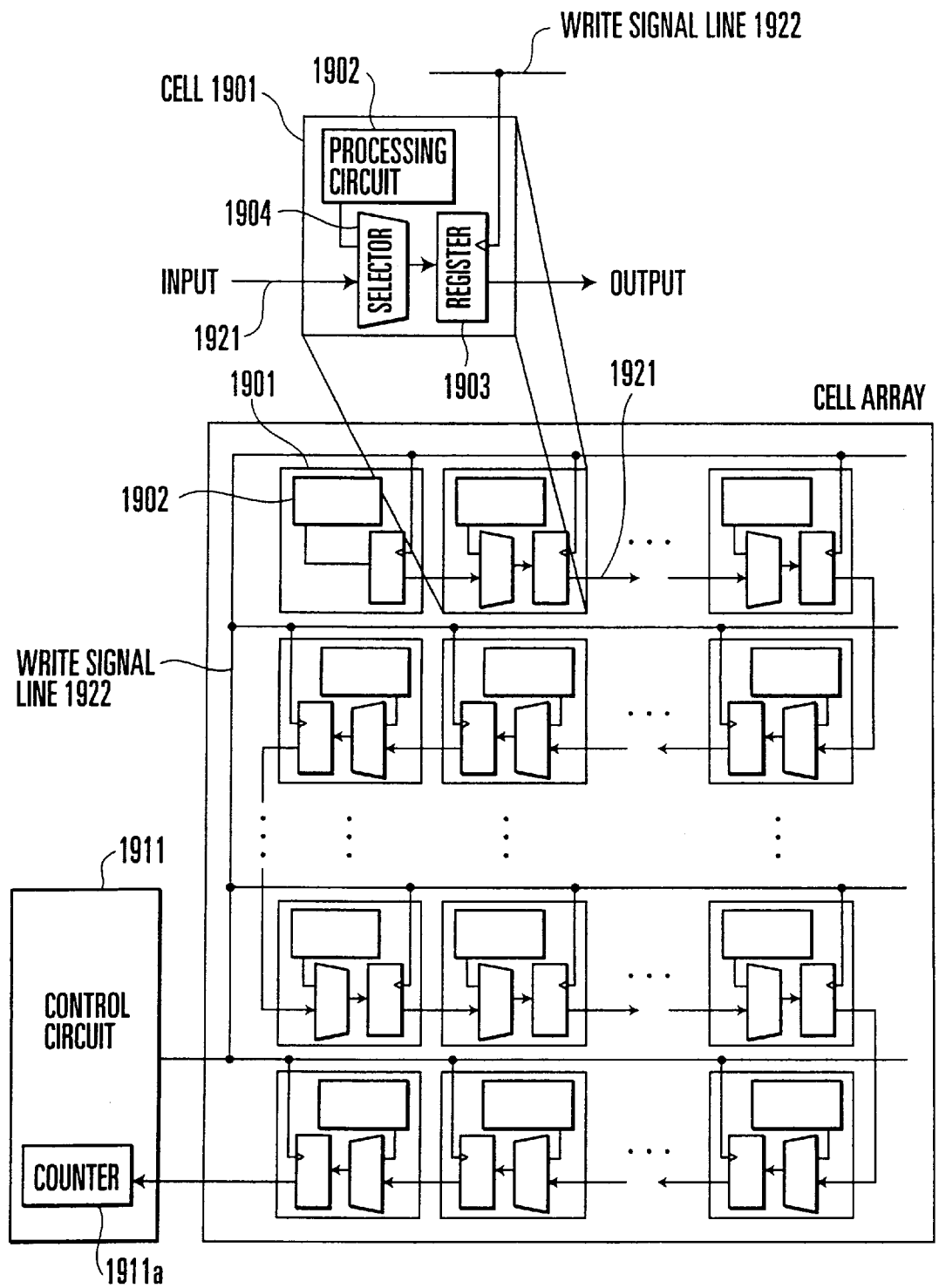
FIG. 19 is a block diagram showing still another arrangement of the conventional parallel-processing apparatus.

The variable-delay circuit of the sixth embodiment will be explained. As shown in FIG. 15, the variable-delay circuit has one path for passing an input measurement input signal. Similar to the fifth embodiment (FIG. 14), the variable-delay circuit is constituted by two inverter circuits 1501 and 1502. The source terminal of a pMOS transistor 1501a of the preceding inverter circuit 1501 is connected to the power supply via a resistor R and two or more, e.g., four pMOS transistors 1503a, 1503b, 1503c, and 1503d in parallel with each other.

The pMOS transistors 1503a, 1503b, 1503c, and 1503d have different power supply amounts owing to the differences in gate length, and their power supply amounts satisfy the transistor 1503a<1503b<1503c<1503d. The transistor 1503a is turned on when a control signal $C_0$ is input to its gate; the transistor 1503b is turned on when a control signal $C_1$ is input to its gate; the transistor 1503c is turned on when a control signal $C_2$ is input to its gate; and the transistor 1503d is turned on when a control signal $C_3$ is input to its gate. In this case, a processing circuit 101 outputs four 1-bit control signals $C_1$, $C_2$, $C_3$, and $C_4$.

In the variable-delay circuit 103 of FIG. 15, the power supply amount to the pMOS transistor 1501a of the preceding inverter circuit 1501 changes depending on the ON states of the pMOS transistors 1503a, 1503b, 1503c, and 1503d. If a fall signal is input as an input signal upon the change in power supply amount, the operation speed of the preceding pMOS transistor changes depending on the state of a control signal. Hence, the signal propagation delay time changes as shown in FIG. 16. Since the power supply transistors 1503a, 1503b, 1503c, and 1503d have different power supply amounts owing to the differences in size such gate length, control signals input to their gates can be weighted. Assigning an n-bit binary number to n control signals implements a variable-delay circuit which copes with even accumulation of multilevel processing results.

FIG. 16 shows the propagation waveform of a measurement input signal in the variable-delay circuit 103 of FIG. 15 with respect to the control signals $C_1$, $C_2$, $C_3$, and $C_4$ from the processing circuit 101. As a 4-bit value assigned to each control signal is larger, the propagation delay of the measurement input signal is longer. Using the method of the sixth embodiment enables accumulating all processing results at a high speed with low power consumption in a circuit in which the processing result of each cell is multilevel data. In the sixth embodiment, the fall signal is used as a measurement input signal. Alternatively, the rise signal may also be used as a measurement input signal by connecting the source terminal of the nMOS transistor of the preceding inverter circuit 1501 to the power supply via two or more nMOS transistors having different power supply amounts.

Seventh Embodiment

Figure 21:
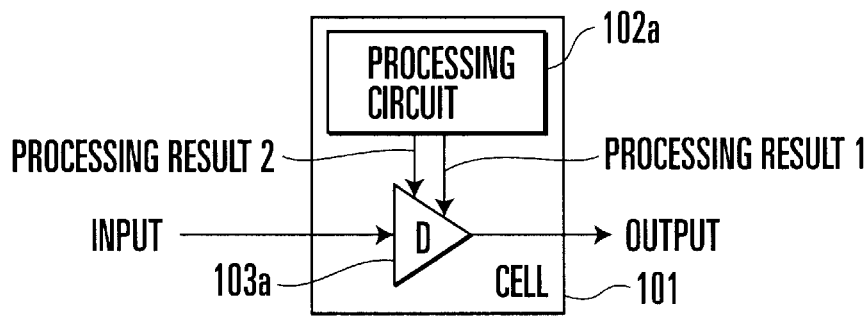
FIG. 21 is a diagram showing the arrangement of a cell in another embodiment of the present invention.
Figure 22:
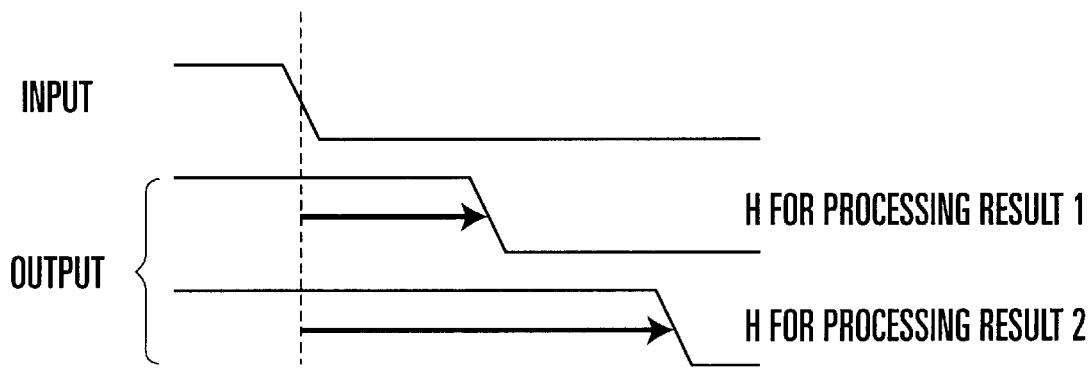
FIG. 22 is a waveform chart showing the waveform of each output signal from an output terminal in the cell arrangement of FIG. 21.

The seventh embodiment of the present invention will be described. In the seventh embodiment, the cell 101 in the first embodiment is constituted by as shown in FIG. 21. A variable-delay circuit 103a receives two processing results 1 and 2 from a processing circuit 102a. The variable-delay circuit 103a changes the signal delay of an output signal in accordance with the states of processing results 1 and 2, as shown in FIG. 22. More specifically, the delay is short when processing result 1 is at H, and long when processing result 2 is at H, and vice versa. As described above, the processing results of the processing circuit 102a for performing processing of two systems are input to the variable-delay circuit 103a where the processing results can be accumulated.

Figure 23:
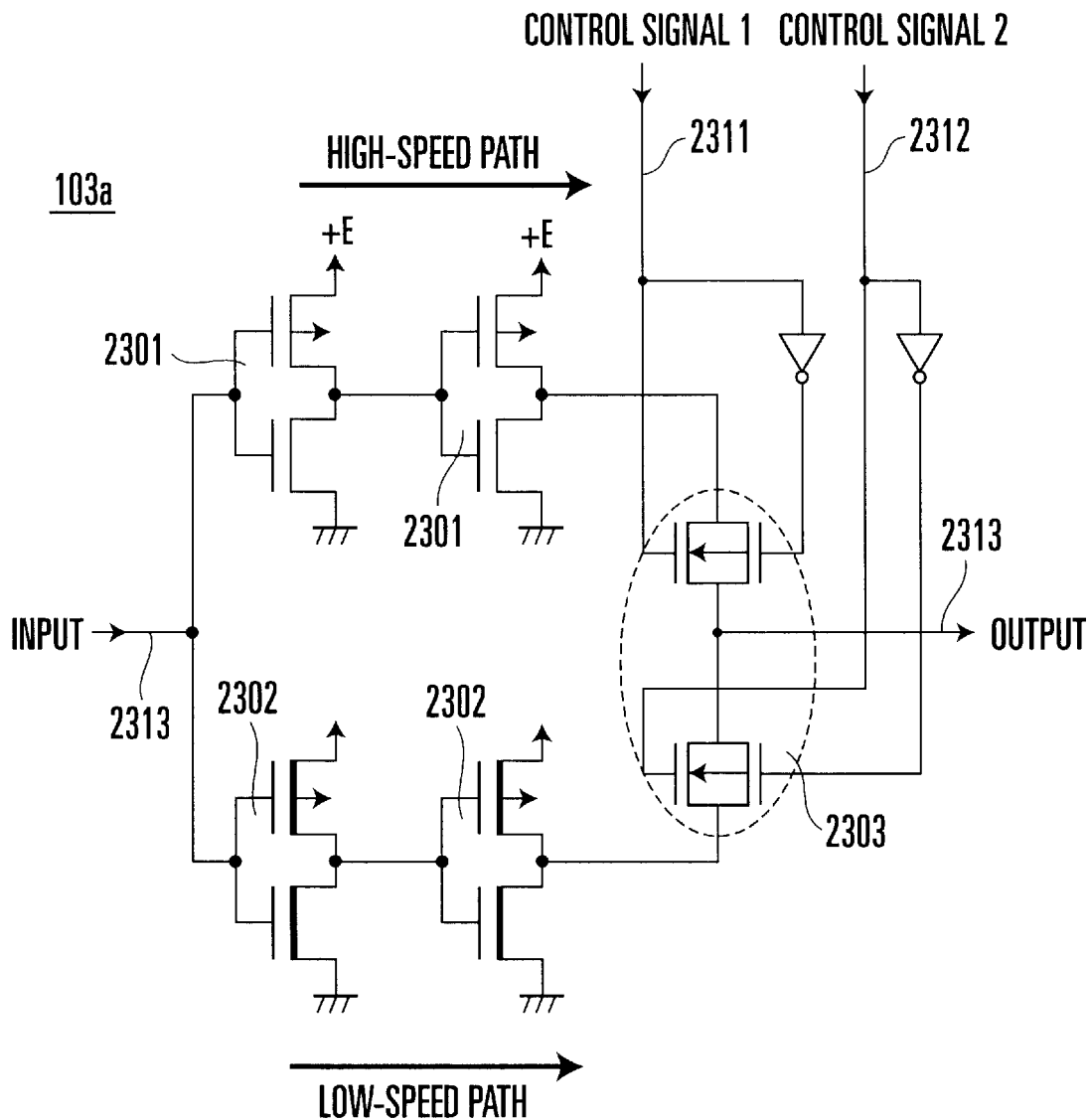
FIG. 23 is a circuit diagram showing the arrangement of a variable-delay circuit 103*a* in FIG. 21.

FIG. 23 shows an arrangement of the variable-delay circuit 103a. The variable-delay circuit 103a has a high-speed path obtained by connecting two inverter circuits 2301 formed from general transistors, and a low-speed path obtained by connecting two inverter circuits 2302 made up of transistors lower in operation speed than general transistors. Either of the high- and low-speed paths is selected in accordance with input control signals 1 and 2 by a switching element 2303 switched by control signals 1 and 2 input from two control terminals 2311 and 2312. A signal input to the input terminal 2312 is output to an output terminal 2313 via the path selected by the switching element 2303.

In the variable-delay circuit 103a, the inverter circuit 2301 for switching the high- and low-speed paths through which a measurement signal propagates is independently controlled by control signals 1 and 2. This can implement a circuit for converting the processing results of two systems into a change in delay time.

Eighth Embodiment

Figure 24:
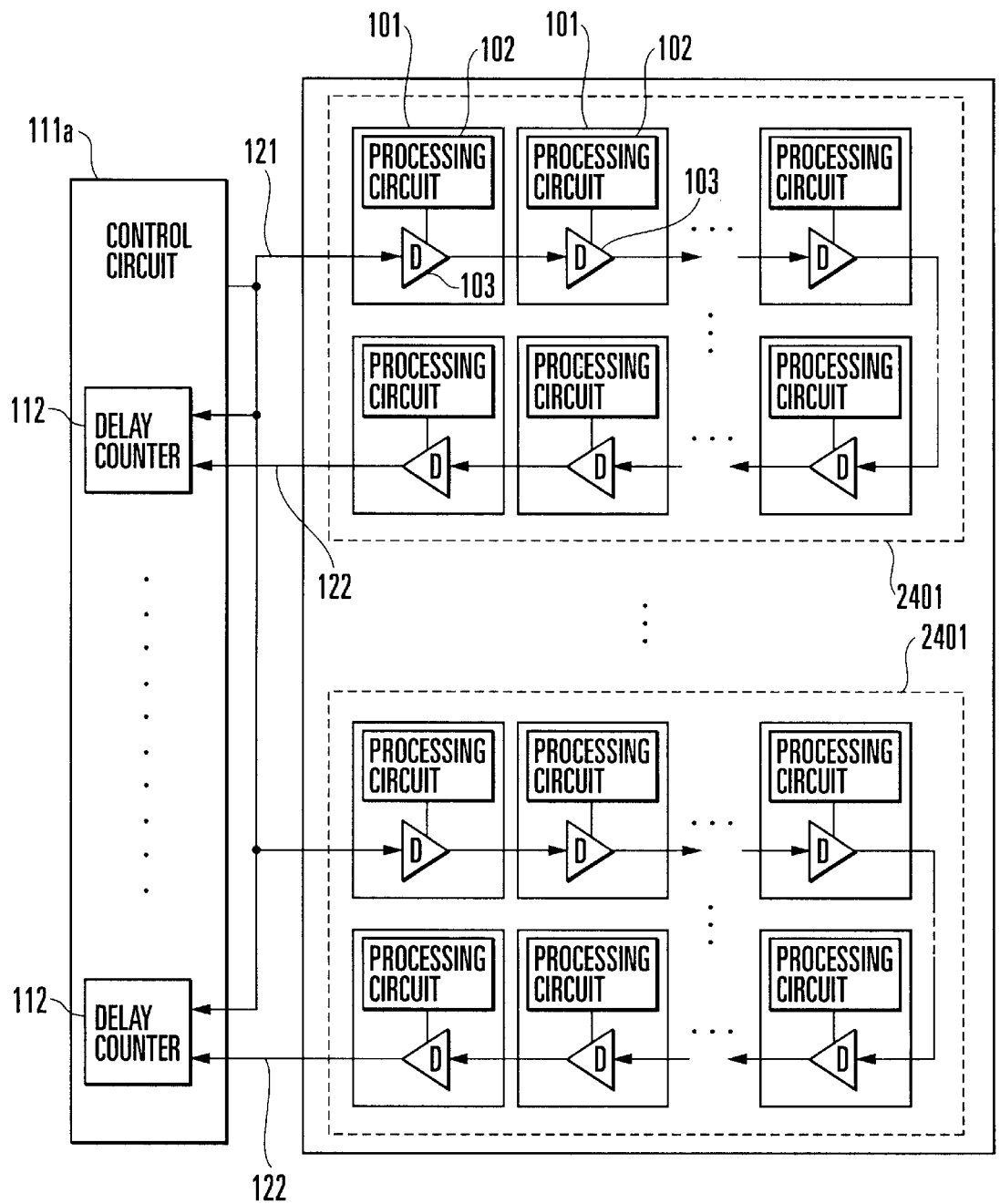
FIG. 24 is a block diagram showing the arrangement of a parallel-processing apparatus in still another embodiment of the present invention.

The eighth embodiment of the present invention will be described. In the eighth embodiment, the arrangement of the parallel-processing apparatus in FIG. 1 is modified as shown in FIG. 24. This arrangement adopts accumulation blocks 2401 each of which has a plurality of series-connected variable-delay circuits 103 and is constituted by a plurality of cells 101. A control circuit 111a comprises a plurality of accumulation blocks 2401, and delay counters 112 each for measuring the delay time of a measurement signal having passed through the array of the series-connected variable-delay circuits 103 in each accumulation block 2401.

A measurement input signal 121 input to the array of the variable-delay circuits 103 in each accumulation block 2401 is a common signal generated by the control circuit 111a. A measurement output signal 122 output from the array of the variable-delay circuits 103 in the accumulation block 2401 is independently input to a corresponding delay counter 112 for each accumulation block 2401. These delay counters 112 accumulate the processing results of the connected accumulation blocks 2401. In this arrangement, the cell array is divided into a plurality of accumulation blocks 2401, which can independently parallel-accumulate processing results. Accordingly, processing results in the cell array can be accumulated at a higher speed, and the results of an arbitrary accumulation block 2401 can be accumulated.

Ninth Embodiment

Figure 25:
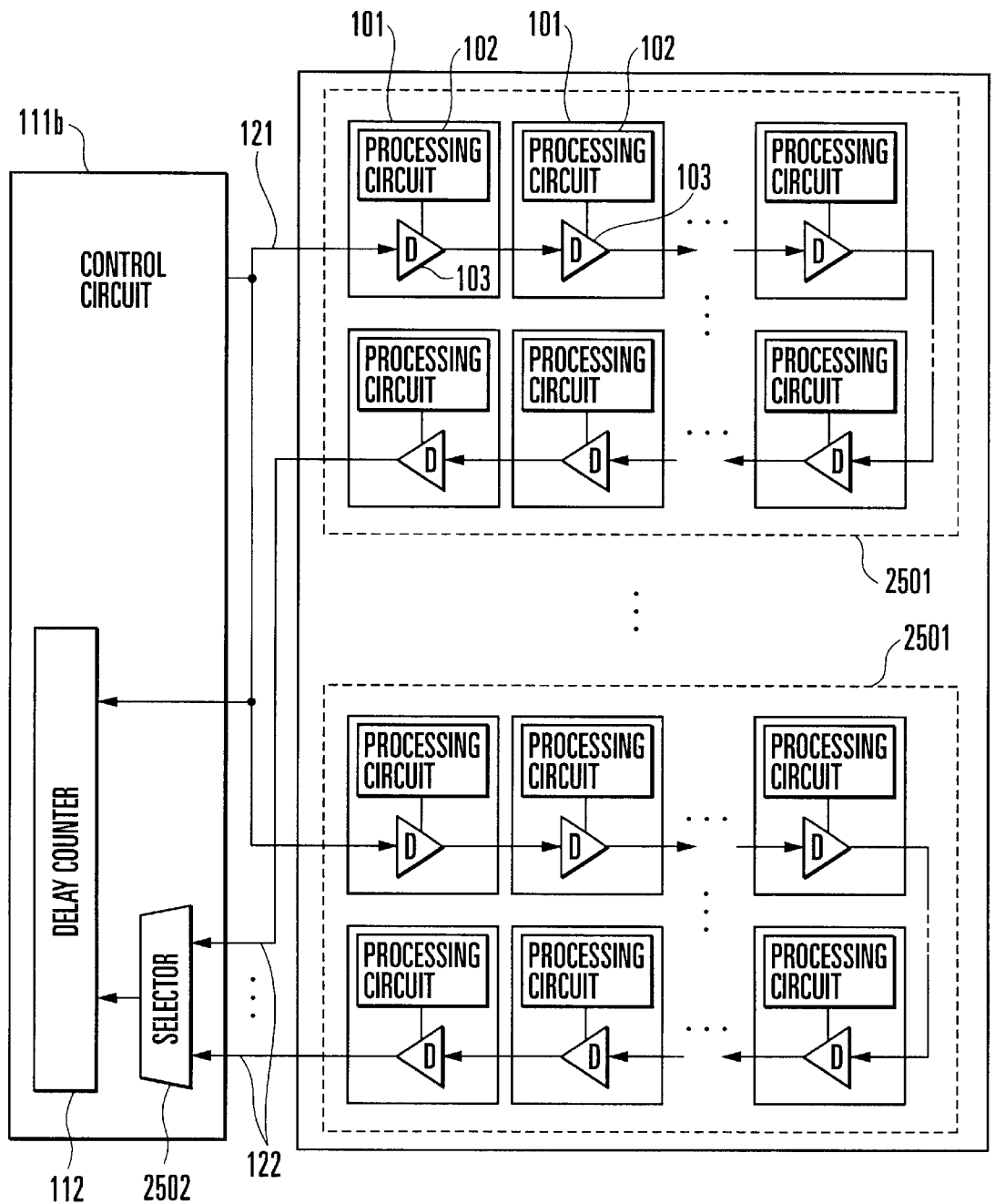
FIG. 25 is a block diagram showing the arrangement of a parallel-processing apparatus in still another embodiment of the present invention.

The ninth embodiment of the present invention will be described. In the ninth embodiment of the present invention, the arrangement of the parallel-processing apparatus in FIG. 24 is modified as shown in FIG. 25. In this arrangement, measurement output signals 122 from a plurality of accumulation blocks 2501 are input to one delay counter 112 via a selector 2502 in a control circuit 111b. Accumulation of results from each accumulation block 2501 is accomplished by allowing the selector 2502 to select a measurement output signal from an arbitrary accumulation block 2501 and allowing the delay counter 112 to measure the delay of the measurement output signal 122. This arrangement can accumulate the results of an arbitrary accumulation block 2501 by one delay counter 112. An arrangement denoted by other reference numerals is the same as in FIG. 24.

In the above description, the processing circuit is the same for all the cells. However, the processing circuit is not limited to this, and may differ for each cell as far as the processing results of processing circuits in a plurality of cells can be obtained by a delay counter (delay measurement means) from an output (measurement output signal) from the variable-delay circuit array. For example, the processing results of processing circuits may be different as long as the delays of variable-delay circuits are the same for all the cells.

As has been described above, according to the present invention, respective cells comprise variable-delay circuits which change the signal propagation delays in accordance with the processing results of processing circuits and are series-connected over a plurality of cells. Accumulation of the processing results of the processing circuits in a plurality of cells reflects on the propagation delay of a measurement input signal on the variable-delay circuit array. Since the accumulation reflects on the propagation delay of a measurement input signal on the variable-delay circuit array, the processing results of respective cells can be accumulated using only one measurement input signal. The processing results of all the cells can be effectively accumulated at a high speed with low power consumption.

According to the present invention, respective cells comprise variable-delay circuits which change the signal propagation delays in accordance with the processing results of processing circuits and are series-connected over a plurality of cells. Accumulation of the processing results of the processing circuits in a plurality of cells reflects on the propagation delay when a measurement input signal on the variable-delay circuit array changes from the second level to the first level. Since the accumulation reflects on the propagation delay caused by the level change of a measurement input signal on the variable-delay circuit array, the processing results of respective cells can be accumulated using only one measurement input signal. The processing results of all the cells can be effectively accumulated at a high speed with low power consumption.

What is claimed is:

1. A parallel-processing apparatus comprising:
   a plurality of cells each having a processing circuit for performing arbitrary processing;
   variable-delay circuits which are respectively arranged in said cells, change a signal propagation delay in accordance with processing results of said processing circuits in corresponding cells, and are series-connected over said plurality of cells;
   signal output means for outputting a measurement input signal to a first variable-delay circuit of a variable-delay circuit array constituted by series-connecting all said variable-delay circuits;
   a delay counter for receiving the measurement input signal output from said signal output means and a measurement output signal output from a final variable-delay circuit of the variable-delay circuit array upon input of the measurement input signal to the first variable-delay circuit of the variable-delay circuit array, and obtaining a signal propagation delay time of the variable-delay circuit array on the basis of the measurement input and output signals; and
   accumulation means for accumulating processing results of said processing circuits in said plurality of cells on the basis of the signal propagation delay time of the variable-delay circuit array obtained by said delay counter.

2. An apparatus according to claim 1, wherein said delay counter comprises:
   a delay detection circuit for outputting a signal of a second level when one of the input measurement input and output signals is at a first level and the other is at the second level;
   a pulse generation circuit for generating a pulse signal having a predetermined frequency only when a signal output from said delay detection circuit is at the second level; and
   a pulse counter for counting the number of pulses of the pulse signal generated by said pulse generation circuit.

3. An apparatus according to claim 1, wherein said delay counter comprises:
   a set/reset flip-flop having a set terminal for receiving an input measurement input signal, a reset terminal for receiving an input measurement output signal, and an output terminal for keeping outputting a signal of a second level until the measurement output signal input to the reset terminal changes from a first level to the second level after the measurement input signal input to the set terminal changes from the first level to the second level;
   a pulse generation circuit for generating a pulse signal having a predetermined frequency only when a signal output from the output terminal of said set/reset flip-flop is at the second level; and
   a pulse counter for counting the number of pulses of the pulse signal generated by said pulse generation circuit.

4. An apparatus according to claim 1, wherein
said variable-delay circuit comprises:
  a high-speed signal path including first transistors;
  a low-speed signal path which includes second transistors lower in response speed than said first transistors, and is longer in propagation delay than the high-speed signal path; and
  a switching element for selecting either of the high- and low-speed signal paths in accordance with the processing result of said processing circuit, and
  the measurement input signal output from said signal output means passes through either of the high- and low-speed signal paths selected by said switching element.

5. A parallel processing method for a parallel-processing apparatus having
  a plurality of cells each having a processing circuit for performing arbitrary processing,
  variable-delay circuits which are respectively arranged in the cells, change a signal propagation delay in accordance with processing results of the processing circuits in corresponding cells, and are series-connected over the plurality of cells,
  signal output means for outputting a measurement input signal to a first variable-delay circuit of a variable-delay circuit array constituted by series-connecting all the variable-delay circuits, and
  a delay counter for receiving the measurement input signal output from the signal output means and a measurement output signal output from a final variable-delay circuit of the variable-delay circuit array, comprising:
    the first step of causing the respective processing circuits in the plurality of cells to perform predetermined processing;
    the second step of changing the signal propagation delay of the variable-delay circuits in the cells on the basis of processing results of the processing circuits for the plurality of cells;
    the third step of simultaneously inputting the measurement input signal output from the signal output mans to the delay counter and the first variable-delay circuit of the variable-delay circuit array;
    the fourth step of inputting, to the delay counter, the measurement output signal output from the final variable-delay circuit of the variable-delay circuit array after the measurement input signal output from the signal output means is input to the first variable-delay circuit of the variable-delay circuit array;
    the fifth step of obtaining a signal propagation delay time of the variable-delay circuit array on the basis of a temporal difference between the measurement input and output signals input to the delay counter; and
    the sixth step of accumulating the processing results of the processing circuits in the plurality of cells on the basis of the signal propagation delay time of the variable-delay circuit array.

6. A method according to claim 5, wherein
the delay counter comprises a delay detection circuit for outputting a signal of a second level when one of the input measurement input and output signals is at a first level and the other is at the second level, a pulse generation circuit for generating a pulse signal having a predetermined frequency only when a signal output from the delay detection circuit is at the second level, and a pulse counter for counting the number of pulses of the pulse signal generated by the pulse generation circuit,
the third step comprises causing the signal output means to keep the output measurement input signal at the second level for a predetermined period and then change the measurement input signal to the first level,
the fifth step comprises obtaining the signal propagation delay time of the variable-delay circuit array by, until the measurement output signal input to the delay detection circuit changes to the first level after the measurement input signal input to the delay counter changes to the first level, causing the delay detection circuit to output a signal of the second level, causing the pulse generation circuit to generate the pulse signal having the predetermined frequency, and causing the pulse counter to count the number of pulses of the pulse signal generated by the pulse generation circuit.

7. A method according to claim 5, wherein
the delay counter comprises a set/reset flip-flop having a set terminal for receiving an input measurement input signal, a reset terminal for receiving an input measurement output signal, and an output terminal for keeping outputting a signal of a second level until the measurement output signal input to the reset terminal changes from a first level to the second level after the measurement input signal input to the set terminal changes from the first level to the second level, a pulse generation circuit for generating a pulse signal having a predetermined frequency only when a signal of the second level is output from the output terminal of said set/reset flip-flop, and a pulse counter for counting the number of pulses of the pulse signal generated by the pulse generation circuit,
the third step comprises causing the signal output means to set the output measurement input signal to the second level from the first level state for a predetermined period, and
the fifth step comprises obtaining the signal propagation delay time of the variable-delay circuit array by, until the measurement output signal input to the delay counter changes from the first level to the second level after the measurement input signal input to the delay counter changes from the first level to the second level, causing the set/reset flip-flop to output a signal of the second level, causing the pulse generation circuit to generate the pulse signal having the predetermined frequency, and causing the pulse counter to count the number of pulses of the pulse signal generated by the pulse generation circuit.

8. A method according to claim 5, wherein
the variable-delay circuit comprises a high-speed signal path including first transistors, a low-speed signal path including second transistors lower in response speed than the first transistors, and a switching element for selecting either of the high- and low-speed signal paths in accordance with the processing result of the processing circuit, and
the second step comprises changing the signal propagation delay of the variable-delay circuit by selecting either of the high- and low-speed signal paths by the switching element on the basis of the processing result of the processing circuit as a propagation path of the measurement input signal output from the signal output means.

9. A parallel-processing apparatus comprising:
   a plurality of cells each having a processing circuit for performing arbitrary processing;
   variable-delay circuits which are respectively arranged in said cells, change a propagation delay of a signal that changes from a second level to a first level, in accordance with processing results of said processing circuits in corresponding cells, and are series-connected over said plurality of cells;
   signal output means for outputting a measurement input signal which changes from the first level to the second level and then returns to the first level after a predetermined first time, to a first variable-delay circuit of a variable-delay circuit array constituted by series-connecting all said variable-delay circuits;
   a delay counter for receiving a measurement output signal output from a final variable-delay circuit of the variable-delay circuit array upon input of the measurement input signal output from said signal output means to the first variable-delay circuit of the variable-delay circuit array, measuring a second time until the measurement output signal returns to the first level after the measurement output signal changes from the first level to the second level, and obtaining a signal propagation delay time of the variable-delay circuit array; and
   accumulation means for accumulating processing results of said processing circuits in said plurality of cells on the basis of the signal propagation delay time of the variable-delay circuit array obtained by said delay counter.

10. An apparatus according to claim 9, wherein said delay counter comprises:
    a pulse generation circuit for generating a pulse signal having a predetermined frequency only when an input signal is at the second level; and
    a pulse counter for counting the number of pulses of the pulse signal generated by said pulse generation circuit.

11. An apparatus according to claim 1, wherein said variable-delay circuit comprises:
    a high-speed signal path including first transistors;
    a low-speed signal path which includes a first transistor and a second transistor lower in response speed than said first transistors of the high-speed signal path, and has a long propagation delay for a signal which changes from a second level to a first level; and
    a switching element for selecting either of the high- and low-speed signal paths in accordance with the processing result of said processing circuit, and
    the measurement input signal output from said signal output means passes through either of the high- and low-speed signal paths selected by said switching element.

12. A parallel processing method for a parallel-processing apparatus having
    a plurality of cells each having a processing circuit for performing arbitrary processing,
    variable-delay circuits which are respectively arranged in the cells, change a propagation delay of a signal that changes from a second level to a first level, in accordance with processing results of the processing circuits in corresponding cells, and are series-connected over the plurality of cells,
    signal output means for outputting a measurement input signal which changes from the first level to the second level, to a first variable-delay circuit of a variable-delay circuit array constituted by series-connecting all the variable-delay circuits, and
    a delay counter for receiving a measurement output signal output from a final variable-delay circuit of the variable-delay circuit array, and measuring a time until the measurement output signal returns to the first level after the measurement output signal changes from the first level to the second level, comprising:
    the first step of causing the respective processing circuits in the plurality of cells to perform predetermined processing;
    the second step of changing the propagation delay of the signal which changes from the second level to the first level in the variable-delay circuits in the cells of the processing circuits on the basis of processing results of the processing circuits for the plurality of cells;
    the third step of changing the measurement input signal input from the signal output means to the first variable-delay circuit of the variable-delay circuit array from the first level to the second level, and then returning the measurement input signal to the first level after a predetermined first time;
    the fourth step of inputting, to the delay counter, a measurement output signal output from the final variable-delay circuit of the variable-delay circuit array upon input of the measurement input signal output from the signal output means to the first variable-delay circuit of the variable-delay circuit array;
    the fifth step of obtaining a signal propagation delay time of the variable-delay circuit array by measuring a second time until the measurement output signal input to the delay counter returns to the first level after the measurement output signal changes from the first level to the second level; and
    the sixth step of accumulating the processing results of the processing circuits in the plurality of cells on the basis of the signal propagation delay time of the variable-delay circuit array.

13. A method according to claim 12, wherein
    the delay counter comprises a pulse generation circuit for generating a pulse signal having a predetermined frequency only when an input signal is at the second level, and a pulse counter for counting the number of pulses of the pulse signal generated by the pulse generation circuit, and
    the fifth step comprises obtaining the signal propagation delay time of the variable-delay circuit array by, until the measurement output signal input to the delay counter returns to the first level after the measurement output signal changes from the first level to the second level, causing the pulse generation circuit to generate the pulse signal having the predetermined frequency, and causing the pulse counter to count the number of pulses of the pulse signal generated by the pulse generation circuit.

14. A method according to claim 12, wherein
    the variable-delay circuit comprises a high-speed signal path including first transistors, a low-speed signal path which includes a first transistor and a second transistor lower in response speed than the first transistors of the high-speed signal path, and has a long propagation delay for the signal which changes from the second level to the first level, and a switching element for selecting either of the high- and low-speed signal paths in accordance with the processing result of the processing circuit, and the second step comprises changing the propagation delay of the signal which changes from the second level to the first level in the variable-delay circuit by selecting either of the high- and low-speed signal paths by the switching element on the basis of processing result of the processing circuit as a propagation path of the measurement input signal output from the signal output means.

15. An apparatus according to claim 1, wherein said variable-delay circuit comprises:
a signal path including first and second inverter circuits each made up of a first MOS transistor of a first conductivity type channel and a second MOS transistor of a second conductivity type channel; and
a parallel circuit constituted by parallel-connecting a third MOS transistor of the first conductivity type channel and a fourth MOS transistor of the first conductivity type channel having a different power supply amount from a power supply amount of the third MOS transistor,
a power supply is connected via said parallel circuit to source terminals of the first MOS transistors of said first inverter circuit, said second inverter circuit, or said first and second inverter circuits, and
a control signal corresponding to the processing result of said processing circuit is input to a gate of the third MOS transistor via an inverter element, and directly input to a gate of the fourth MOS transistor.

16. An apparatus according to claim 1, wherein said processing circuit outputs at least two control signals in accordance with the processing result, said variable-delay circuit comprises:
a signal path including first and second inverter circuits each made up of a first MOS transistor of a first conductivity type channel and a second MOS transistor of a second conductivity type channel; and
a parallel circuit constituted by parallel-connecting a resistor (R) and at least two power supply MOS transistors of the first conductivity type channel having different power supply amounts,
a power supply is connected via said parallel circuit to source terminals of the first MOS transistors of said first inverter circuit, said second inverter circuit, or said first and second inverter circuits, and
at least two control signals output from said processing circuit are input to gate electrodes of any of the power supply MOS transistors.

17. A method according to claim 5, wherein the variable-delay circuit comprises:
a signal path including first and second inverter circuits each made up of a first MOS transistor of a first conductivity type channel and a second MOS transistor of a second conductivity type channel; and
a parallel circuit constituted by parallel-connecting a third MOS transistor of the first conductivity type channel and a fourth MOS transistor of the first conductivity type channel having a different power supply amount from a power supply amount of the third MOS transistor,
a power supply is connected via the parallel circuit to source terminals of the first MOS transistors of the first inverter circuit, the second inverter circuit, or the first and second inverter circuits, and
the second step comprises inputting a control signal of the processing circuit to a gate of the third MOS transistor via an inverter element, directly inputting the control signal to a gate of the fourth MOS transistor to turn on either of the third and fourth MOS transistors in accordance with the processing result of the processing circuit, changing the signal propagation delay on the signal path, and changing the signal propagation delay of the variable-delay circuit.

18. A method according to claim 12, wherein the variable-delay circuit comprises:
a signal path including first and second inverter circuits each made up of a first MOS transistor of a first conductivity type channel and a second MOS transistor of a second conductivity type channel; and
a parallel circuit constituted by parallel-connecting a third MOS transistor of the first conductivity type channel and a fourth MOS transistor of the first conductivity type channel having a different power supply amount from a power supply amount of the third MOS transistor,
a power supply is connected via the parallel circuit to source terminals of the first MOS transistors of the first inverter circuit, the second inverter circuit, or the first and second inverter circuits, and
the second step comprises inputting a control signal of the processing circuit to a gate of the third MOS transistor via an inverter element, directly inputting the control signal to a gate of the fourth MOS transistor to turn on either of the third and fourth MOS transistors in accordance with the processing result of the processing circuit, changing the signal propagation delay on the signal path, and changing the propagation delay of the signal which changes from the second level to the first level in the variable-delay circuit.

19. A method according to claim 5, wherein the processing circuit outputs at least two control signals in accordance with the processing result, the variable-delay circuit comprises:
a signal path including first and second inverter circuits each made up of a first MOS transistor of a first conductivity type channel and a second MOS transistor of a second conductivity type channel; and
a parallel circuit constituted by parallel-connecting a resistor and at least two power supply MOS transistors of the first conductivity type channel having different power supply amounts,
a power supply is connected via the parallel circuit to source terminals of the first MOS transistors of the first inverter circuit, the second inverter circuit, or the first and second inverter circuits, and
the second step comprises inputting at least two control signals of the processing circuit to gates of any of the power supply MOS transistors to turn on any of the power supply MOS transistors in accordance with the processing result of the processing circuit, changing the signal propagation delay on the signal path in correspondence with the power supply amounts of the ON power supply MOS transistors, and changing the signal propagation delay of the variable-delay circuit.

20. A method according to claim 12, wherein the processing circuit outputs at least two control signals in accordance with the processing result, the variable-delay circuit comprises:
a signal path including first and second inverter circuits each made up of a first MOS transistor of a first conductivity type channel and a second MOS transistor of a second conductivity type channel; and a parallel circuit constituted by parallel-connecting a resistor and at least two power supply MOS transistors of the first conductivity type channel having different power supply amounts, a power supply is connected via the parallel circuit to source terminals of the first MOS transistors of the first inverter circuit, the second inverter circuit, or the first and second inverter circuits, and the second step comprises inputting at least two control signals of the processing circuit to gates of any of the power supply MOS transistors to turn on any of the power supply MOS transistors in accordance with the processing result of the processing circuit, changing the signal propagation delay on the signal path in correspondence with the power supply amounts of the ON power supply MOS transistors, and changing the propagation delay of the signal which changes from the second level to the first level in the variable-delay circuit.

21. A parallel-processing apparatus comprising:

a plurality of cells each having a processing circuit for performing arbitrary processing;

variable-delay circuits which are respectively arranged in said cells, change a signal propagation delay in accordance with processing results of said processing circuits in corresponding cells, and are series-connected over said plurality of cells;

signal output means for outputting a measurement input signal to a first variable-delay circuit of a variable-delay circuit array constituted by series-connecting all said variable-delay circuits; and delay measurement means for receiving the measurement input signal output from said signal output means and a measurement output signal output from a final variable-delay circuit of the variable-delay circuit array upon input of the measurement input signal to the first variable-delay circuit of the variable-delay circuit array, obtaining a signal propagation delay time of the variable-delay circuit array on the basis of the measurement input and output signals, and obtaining processing results by said processing circuits in said plurality of cells.

22. A parallel-processing apparatus comprising:

a plurality of cells each having a processing circuit for performing arbitrary processing;

variable-delay circuits which are respectively arranged in said cells, change a propagation delay of a signal that changes from a second level to a first level, in accordance with processing results of said processing circuits in corresponding cells, and are series-connected over said plurality of cells;

signal output means for outputting a measurement input signal which changes from the first level to the second level and then returns to the first level after a predetermined first time, to a first variable-delay circuit of a variable-delay circuit array constituted by series-connecting all said variable-delay circuits; and delay measurement means for receiving a measurement output signal output from a final variable-delay circuit of the variable-delay circuit array upon input of the measurement input signal output from said signal output means to the first variable-delay circuit of the variable-delay circuit array, measuring a second time until the measurement output signal returns to the first level after the measurement output signal changes from the first level to the second level, obtaining a signal propagation delay time of the variable-delay circuit array, and obtaining processing results by said processing circuits in said plurality of cells.

23. An apparatus according to claim 1, wherein said processing circuit outputs first and second processing results, and said variable-delay circuit delays a signal propagating through said variable-delay circuit by the first time upon reception of the first processing result, and delays the signal propagating through said variable-delay circuit by the second time upon reception of the second processing result.

24. An apparatus according to claim 23, wherein the first time is longer than the second time.

25. An apparatus according to claim 21, wherein said processing circuit outputs first and second processing results, and said variable-delay circuit delays a signal propagating through said variable-delay circuit by the first time upon reception of the first processing result, and delays the signal propagating through said variable-delay circuit by the second time upon reception of the second processing result.

26. An apparatus according to claim 1, wherein said apparatus further comprises a plurality of blocks each having said plurality of cells, the measurement input signal output from said signal output means is input to a first variable-delay circuit in each block, and said delay counter is connected to an output terminal of a final variable-delay circuit in each block, and arranged for each block.

27. An apparatus according to claim 21, wherein said apparatus further comprises a plurality of blocks each having said plurality of cells, the measurement input signal output from said signal output means is input to a first variable-delay circuit in each block, and said delay measurement means is connected to an output terminal of a final variable-delay circuit in each block, and arranged for each block.

28. An apparatus according to claim 1, wherein said apparatus further comprises:
a plurality of blocks each having said plurality of cells; and
a selector which is connected to an output terminal of a final variable-delay circuit in each block, selects any one of said plurality of blocks, and outputs a measurement output signal output from a final variable-delay circuit in the selected block,
the measurement input signal output from said signal output means is input to a first variable-delay circuit in each block, and
said delay counter obtains the signal propagation delay time on the basis of the measurement output signal output from said selector and the measurement input signal.

29. An apparatus according to claim 21, wherein said apparatus further comprises:
a plurality of blocks each having said plurality of cells; and
a selector which is connected to an output terminal of a final variable-delay circuit in each block, selects any one of said plurality of blocks, and outputs a measurement output signal output from a final variable-delay circuit in the selected block, the measurement input signal output from said signal output means is input to a first variable-delay circuit in each block, and said delay measurement means obtains the signal propagation delay time on the basis of the measurement output signal output from said selector and the measurement input signal.

30. An apparatus according to claim 1, wherein said processing circuits arranged in said plurality of cells are identical to each other.

31. An apparatus according to claim 9, wherein said variable-delay circuit comprises:
- a high-speed signal path including first transistors;
- a low-speed signal path which includes a first transistor and a second transistor lower in response speed than said first transistors of the high-speed signal path, and has a long propagation delay for the signal which changes from the second level to the first level; and
- a switching element for selecting either of the high- and low-speed signal paths in accordance with the processing result of said processing circuit, and the measurement input signal output from said signal output means passes through either of the high- and low-speed signal paths selected by said switching element.

32. An apparatus according to claim 9, wherein said variable-delay circuit comprises:
- a signal path including first and second inverter circuits each made up of a first MOS transistor of a first conductivity type channel and a second MOS transistor of a second conductivity type channel; and
- a parallel circuit constituted by parallel-connecting a third MOS transistor of the first conductivity type channel and a fourth MOS transistor of the first conductivity type channel having a different power supply amount from a power supply amount of the third MOS transistor,
- a power supply is connected via said parallel circuit to source terminals of the first MOS transistors of said first inverter circuit, said second inverter circuit, or said first and second inverter circuits, and
- a control signal corresponding to the processing result of said processing circuit is input to a gate of the third MOS transistor via an inverter element, and directly input to a gate of the fourth MOS transistor.

33. An apparatus according to claim 9, wherein said processing circuit outputs at least two control signals in accordance with the processing result, said variable-delay circuit comprises:
- a signal path including first and second inverter circuits each made up of a first MOS transistor of a first conductivity type channel and a second MOS transistor of a second conductivity type channel; and
- a parallel circuit constituted by parallel-connecting a resistor and at least two power supply MOS transistors of the first conductivity type channel having different power supply amounts,
- a power supply is connected via said parallel circuit to source terminals of the first MOS transistors of said first inverter circuit, said second inverter circuit, or said first and second inverter circuits, and
- at least two control signals output from said processing circuit are input to gate electrodes of the power supply MOS transistors.

* * * * *